US010474735B2

(12) United States Patent
DeLoach et al.

(10) Patent No.: US 10,474,735 B2
(45) Date of Patent: Nov. 12, 2019

(54) DYNAMIC ZOOMING OF CONTENT WITH OVERLAYS

(71) Applicant: ACOUSTIC, L.P., New York, NY (US)

(72) Inventors: Kevin DeLoach, San Francisco, CA (US); Shawn Simon, San Francisco, CA (US); Christopher Fraschetti, San Francisco, CA (US); Matthew Cordasco, San Francisco, CA (US)

(73) Assignee: Acoustic, L.P., New York, NY (US)

( * ) Notice: Subject to any disclaimer, the term of this patent is extended or adjusted under 35 U.S.C. 154(b) by 393 days.

(21) Appl. No.: 13/828,476

(22) Filed: Mar. 14, 2013

(65) Prior Publication Data

US 2014/0143652 A1     May 22, 2014

Related U.S. Application Data

(60) Provisional application No. 61/727,915, filed on Nov. 19, 2012.

(51) Int. Cl.
*G06F 17/00* (2019.01)
*G06F 17/21* (2006.01)
(Continued)

(52) U.S. Cl.
CPC ............ *G06F 17/212* (2013.01); *G06F 9/545* (2013.01); *G06F 17/2247* (2013.01)

(58) Field of Classification Search
CPC ............... G06F 9/545; G06F 17/30955; G06F 17/2247; G06F 17/241; G06F 15/173; G06F 17/212

(Continued)

(56) References Cited

U.S. PATENT DOCUMENTS 5,463,547 A    10/1995  Markowitz
5,564,043 A    10/1996  Siefert
(Continued)

FOREIGN PATENT DOCUMENTS

CA    2656539    2/2008
CA    2696884    3/2009
(Continued)

OTHER PUBLICATIONS

Mel, Aug. 23, 2009, Distribute paths to separate layers—illustrator tutorial, pp. 1-3.*

(Continued)

*Primary Examiner* — Justin S Lee
*Assistant Examiner* — Benjamin J Norris
(74) *Attorney, Agent, or Firm* — Mauriel Kapouytian Woods LLP; Serge Krimnus; James Woods

(57) ABSTRACT

A dynamic zooming system may use overlays to display usage information over associated webpages. In one example, a replay manager may zoom-in on particular areas of the webpages to view more specific usage information. In another example, the replay manager may zoom-out the webpages to view more general usage information. The dynamic zooming system may use a first scaled overlay layer to dynamically vary a zoom level of the usage information to match a zoom level for the webpages. The dynamic zooming system also may use a second fixed overlay layer to display other usage information independently of the zoom-level for the webpages.

28 Claims, 13 Drawing Sheets

(51) Int. Cl.
*G06F 9/54* (2006.01)
*G06F 17/22* (2006.01)

(58) Field of Classification Search
USPC .................................................. 715/760, 234
See application file for complete search history.

(56) References Cited

U.S. PATENT DOCUMENTS

| | | | |
|---|---|---|---|
| 5,577,254 A | 11/1996 | Gilbert | |
| 5,699,526 A | 12/1997 | Siefert | |
| 5,715,314 A | 2/1998 | Payne | |
| 5,717,879 A | 2/1998 | Moran et al. | |
| 5,721,906 A | 2/1998 | Siefert | |
| 5,751,962 A | 5/1998 | Fanshier et al. | |
| 5,774,552 A | 6/1998 | Grimmer | |
| 5,781,735 A | 7/1998 | Southard | |
| 5,809,250 A | 9/1998 | Kisor | |
| 5,825,880 A | 10/1998 | Sudia | |
| 5,832,458 A | 11/1998 | Jones | |
| 5,832,496 A | 11/1998 | Anand et al. | |
| 5,845,124 A | 12/1998 | Berman | |
| 5,848,396 A | 12/1998 | Gerace | |
| 5,848,412 A | 12/1998 | Rowland | |
| 5,857,188 A | 1/1999 | Douglas | |
| 5,867,578 A | 2/1999 | Brickell | |
| 5,870,559 A | 2/1999 | Leshem et al. | |
| 5,894,516 A | 4/1999 | Brandenburg | |
| 5,903,652 A | 5/1999 | Mital | |
| 5,905,868 A | 5/1999 | Baghai et al. | |
| 5,909,492 A | 6/1999 | Payne | |
| 5,930,786 A | 7/1999 | Carino, Jr. et al. | |
| 5,933,601 A | 8/1999 | Fanshier et al. | |
| 5,941,957 A | 8/1999 | Ingrassia, Jr. et al. | |
| 5,951,643 A | 9/1999 | Shelton et al. | |
| 5,951,652 A | 9/1999 | Ingrassia, Jr. | |
| 5,954,798 A | 9/1999 | Shelton | |
| 5,991,791 A | 11/1999 | Siefert | |
| 6,006,228 A | 12/1999 | McCollum | |
| 6,026,403 A | 2/2000 | Siefert | |
| 6,035,332 A | 3/2000 | Ingrassia, Jr. | |
| 6,085,223 A | 7/2000 | Carino, Jr. | |
| 6,151,584 A | 11/2000 | Papierniak | |
| 6,151,601 A | 11/2000 | Papierniak et al. | |
| 6,169,997 B1 | 1/2001 | Papierniak | |
| 6,182,097 B1 | 1/2001 | Hansen | |
| 6,253,203 B1 | 6/2001 | O'Flaherty | |
| 6,286,030 B1 | 9/2001 | Wenig | |
| 6,286,046 B1 | 9/2001 | Bryant | |
| 6,286,098 B1 | 9/2001 | Wenig | |
| 6,295,550 B1 | 9/2001 | Choung | |
| 6,317,794 B1 | 11/2001 | Papierniak | |
| 6,334,110 B1 | 12/2001 | Walter | |
| 6,397,256 B1 | 5/2002 | Chan | |
| 6,418,439 B1 | 7/2002 | Papierniak | |
| 6,480,855 B1 | 11/2002 | Siefert | |
| 6,502,086 B2 | 12/2002 | Siefert | |
| 6,502,096 B1 | 12/2002 | Siefert | |
| 6,519,600 B1 | 2/2003 | Siefert | |
| 6,589,980 B2 | 7/2003 | Miller | |
| 6,651,072 B1 | 11/2003 | Carino, Jr. | |
| 6,658,453 B1 | 12/2003 | Dattatri | |
| 6,671,687 B1 | 12/2003 | Pederson | |
| 6,714,931 B1 | 3/2004 | Papierniak et al. | |
| 6,766,333 B1 | 7/2004 | Wu | |
| 6,850,975 B1 | 2/2005 | Daneels et al. | |
| 6,877,007 B1 | 4/2005 | Hentzel et al. | |
| 7,076,495 B2 | 7/2006 | Dutta | |
| 7,260,837 B2 | 8/2007 | Abraham et al. | |
| 7,272,639 B1 | 9/2007 | Levergood | |
| 7,278,105 B1 | 10/2007 | Kitts | |
| 7,293,281 B1 | 11/2007 | Moran et al. | |
| 7,490,319 B2 | 2/2009 | Blackwell et al. | |
| 7,580,996 B1 | 8/2009 | Allan | |
| 7,627,648 B1 | 12/2009 | Mehta | |
| RE41,903 E | 10/2010 | Wenig | |
| 7,983,961 B1 | 7/2011 | Chang | |
| 8,042,055 B2 | 10/2011 | Wenig | |
| 8,127,000 B2 | 2/2012 | Wenig | |
| 8,219,531 B2 | 7/2012 | Eagan | |
| 8,225,376 B2 | 7/2012 | Zuckerberg | |
| 8,266,673 B2 | 9/2012 | Hu | |
| 8,335,848 B2 | 12/2012 | Wenig | |
| 8,381,088 B2 | 2/2013 | Kikin-Gil et al. | |
| 8,533,532 B2 | 9/2013 | Wenig | |
| 8,583,772 B2 | 11/2013 | Wenig | |
| 8,832,846 B2 | 9/2014 | Udani | |
| 8,838,736 B2 * | 9/2014 | Swahn | 709/217 |
| 2002/0049840 A1 | 4/2002 | Squire | |
| 2002/0056091 A1 | 5/2002 | Bala | |
| 2002/0065912 A1 | 5/2002 | Catchpole et al. | |
| 2002/0070953 A1 | 6/2002 | Barg et al. | |
| 2002/0083169 A1 | 6/2002 | Aki | |
| 2002/0083183 A1 | 6/2002 | Pujare et al. | |
| 2002/0112035 A1 | 8/2002 | Carey | |
| 2002/0165954 A1 | 11/2002 | Eshghi et al. | |
| 2003/0005000 A1 | 1/2003 | Landsman | |
| 2003/0023715 A1 | 1/2003 | Reiner et al. | |
| 2003/0128233 A1 | 7/2003 | Kasriel | |
| 2003/0145071 A1 | 7/2003 | Straut | |
| 2003/0154289 A1 | 8/2003 | Williamson et al. | |
| 2004/0019675 A1 | 1/2004 | Hebeler | |
| 2004/0059809 A1 | 3/2004 | Benedikt et al. | |
| 2004/0059997 A1 | 3/2004 | Allen et al. | |
| 2004/0078464 A1 | 4/2004 | Rajan | |
| 2004/0100507 A1 | 5/2004 | Hayner et al. | |
| 2004/0158574 A1 | 8/2004 | Tom et al. | |
| 2005/0021713 A1 | 1/2005 | Dugan et al. | |
| 2005/0030966 A1 | 2/2005 | Cai et al. | |
| 2005/0033803 A1 | 2/2005 | Vleet et al. | |
| 2005/0066037 A1 | 3/2005 | Song et al. | |
| 2005/0071464 A1 | 3/2005 | Kuwata et al. | |
| 2005/0071760 A1 | 3/2005 | Jaeger | |
| 2005/0086606 A1 | 4/2005 | Blennerhassett et al. | |
| 2005/0188080 A1 | 8/2005 | Motsinger et al. | |
| 2005/0198315 A1 | 9/2005 | Wesley | |
| 2005/0216856 A1 | 9/2005 | Matti | |
| 2005/0246651 A1 | 11/2005 | Krzanowski | |
| 2005/0278565 A1 | 12/2005 | Frattura et al. | |
| 2006/0048153 A1 | 3/2006 | Truong | |
| 2006/0048214 A1 | 3/2006 | Pennington et al. | |
| 2006/0075088 A1 | 4/2006 | Guo | |
| 2006/0117055 A1 | 6/2006 | Doyle | |
| 2006/0123340 A1 | 6/2006 | Bailey et al. | |
| 2006/0162071 A1 | 7/2006 | Dixon et al. | |
| 2006/0230105 A1 | 10/2006 | Shappir | |
| 2006/0248452 A1 | 11/2006 | Lambert | |
| 2007/0106692 A1 | 5/2007 | Klein | |
| 2007/0174410 A1 | 7/2007 | Croft | |
| 2007/0226314 A1 | 9/2007 | Eick | |
| 2007/0245249 A1 | 10/2007 | Weisberg | |
| 2007/0255754 A1 | 11/2007 | Gheel | |
| 2008/0005661 A1 | 1/2008 | Yao et al. | |
| 2008/0005793 A1 | 1/2008 | Wenig | |
| 2008/0034036 A1 | 2/2008 | Takeshima et al. | |
| 2008/0046562 A1 * | 2/2008 | Butler | 709/224 |
| 2008/0052377 A1 | 2/2008 | Light | |
| 2008/0127217 A1 | 5/2008 | Wang | |
| 2008/0162498 A1 | 7/2008 | Omoigui | |
| 2008/0184129 A1 | 7/2008 | Cancel et al. | |
| 2008/0209311 A1 | 8/2008 | Agronik | |
| 2008/0216094 A1 | 9/2008 | Anderson | |
| 2008/0294974 A1 | 11/2008 | Nurmi et al. | |
| 2009/0013347 A1 | 1/2009 | Ahanger | |
| 2009/0019133 A1 | 1/2009 | Brimley | |
| 2009/0024930 A1 | 1/2009 | Kim | |
| 2009/0037517 A1 | 2/2009 | Frei | |
| 2009/0037914 A1 | 2/2009 | Chagoly et al. | |
| 2009/0063968 A1 | 3/2009 | Wenig | |
| 2009/0070869 A1 | 3/2009 | Fan et al. | |
| 2009/0083714 A1 | 3/2009 | Kiciman et al. | |
| 2009/0132957 A1 | 5/2009 | Reddy | |
| 2009/0138554 A1 | 5/2009 | Longoboard et al. | |
| 2009/0228474 A1 | 9/2009 | Chiu et al. | |
| 2009/0247193 A1 | 10/2009 | Kalavade | |

(56) References Cited

U.S. PATENT DOCUMENTS

| | | | |
|---|---|---|---|
| 2009/0254529 | A1 | 10/2009 | Goldentouch |
| 2010/0007603 | A1 | 1/2010 | Kirkup |
| 2010/0042573 | A1 | 2/2010 | Wenig |
| 2010/0058285 | A1 | 3/2010 | Meijer et al. |
| 2010/0070929 | A1 | 3/2010 | Behl et al. |
| 2010/0146380 | A1 | 6/2010 | Rousso |
| 2010/0169792 | A1 | 7/2010 | Ascar |
| 2010/0174774 | A1 | 7/2010 | Kern |
| 2010/0211638 | A1 | 8/2010 | Rougler |
| 2010/0251128 | A1 | 9/2010 | Cordasco |
| 2010/0268694 | A1 | 10/2010 | Denoue |
| 2010/0287229 | A1 | 11/2010 | Hauser |
| 2010/0318507 | A1 | 12/2010 | Grant et al. |
| 2011/0029665 | A1 | 2/2011 | Wenig et al. |
| 2011/0085526 | A1 | 4/2011 | Joseph |
| 2011/0173239 | A1 | 7/2011 | Sayed |
| 2011/0320880 | A1 | 12/2011 | Wenig |
| 2012/0002903 | A1* | 1/2012 | Wilensky ............... 382/311 |
| 2012/0038546 | A1* | 2/2012 | Cromer ............. G06F 1/1626 345/156 |
| 2012/0038678 | A1 | 2/2012 | Hwang |
| 2012/0084437 | A1 | 4/2012 | Wenig |
| 2012/0089950 | A1 | 4/2012 | Tseng |
| 2012/0102101 | A1 | 4/2012 | Wenig |
| 2012/0151329 | A1 | 6/2012 | Cordasco |
| 2012/0151384 | A1* | 6/2012 | Stass et al. ............... 715/758 |
| 2012/0157122 | A1 | 6/2012 | Niranjan |
| 2012/0173966 | A1 | 7/2012 | Powell |
| 2012/0242604 | A1 | 9/2012 | Kato |
| 2013/0069947 | A1 | 3/2013 | Berstler |
| 2013/0091417 | A1 | 4/2013 | Cordasco |
| 2013/0097484 | A1 | 4/2013 | Nakamura |
| 2013/0104065 | A1 | 4/2013 | Stecher |
| 2013/0136253 | A1 | 5/2013 | Liberman Ben-Ami |
| 2013/0339428 | A1 | 12/2013 | Wenig et al. |
| 2014/0063174 | A1* | 3/2014 | Junuzovic et al. ........ 348/14.02 |
| 2014/0108911 | A1 | 4/2014 | Damale |
| 2014/0109018 | A1 | 4/2014 | Casey |
| 2014/0115506 | A1 | 4/2014 | George |
| 2014/0115712 | A1 | 4/2014 | Powell |
| 2014/0137052 | A1 | 5/2014 | Hernandez |
| 2014/0250110 | A1 | 9/2014 | Yang |
| 2016/0006840 | A1 | 1/2016 | Wenig |

FOREIGN PATENT DOCUMENTS

| | | |
|---|---|---|
| EP | 0326283 | 8/1989 |
| EP | 0843449 | 5/1998 |
| EP | 1097428 | 6/2002 |
| EP | 07840244.3 | 2/2008 |
| EP | 08769998.9 | 3/2009 |
| GB | 2357680 | 6/2008 |
| WO | 9825372 | 6/1998 |
| WO | WO 98/26571 | 6/1998 |
| WO | 9836520 | 8/1998 |
| WO | 0013371 | 3/2000 |
| WO | 0217165 | 2/2002 |
| WO | 2008/019193 | 2/2008 |
| WO | 2009/029316 | 3/2009 |
| WO | 2010019258 | 2/2010 |
| WO | 2010/141748 A1 | 12/2010 |

OTHER PUBLICATIONS

Mahemoff NPL "Mahemoff's Podcast Blog" Mar. 31, 2008 pp. 1-6.*
Alex, Jul. 1, 2008, "Layering IFrames" https://www.datadial.net/blog/layering-iframes-using-positioning-and-z-index/, p. 1.*
Stolowitz Ford Cowger LLP Listing of Related Cases May 14, 2013.
International Search Report for PCT/US2013/023636; dated Aug. 13, 2013.
Written Opinion of the International Searching Authority for PCT/US2013/023636; dated Aug. 13, 2013.
Rubio, An Introduction to JSON, Feb. 28, 2007, http://www.oracle.com/technetwork/articles/entarch/introduction-json-097942.html.
Teare, An Introduction to Ajax, Aug. 2005, http://www.oracle.com/technetwork/articles/entarch/ajax-introduction-096831.html.
Stolowitz Ford Cowger LLP; Listing of Related Cases; Dec. 19, 2013.
Summons to attend oral proceedings pursuant to Rule 115(1) in EP App. No. 07840244.3; Dated Dec. 12, 2013.
U.S. Appl. No. 11/616,616, filed Dec. 27, 2006, Method and Apparatus for Monitoring and Synchronizing User Interface Events With Network Data, Wenig, U.S. Pat. No. 8,127,000.
U.S. Appl. No. 12/049,245, filed Mar. 14, 2008, Replaying Captured Network Interactions, Wenig, U.S. Pat. No. 8,042,055.
U.S. Appl. No. 12/822,137, filed Jun. 23, 2010, System Identifying and Inferring Web Session Events, Wenig, 2011-0320880.
U.S. Appl. No. 12/904,356, filed Oct. 14, 2010, Dynamically Configurable Session Agent, Chen, 2011-0029665.
U.S. Appl. No. 11/247,001, filed Oct. 7, 2005, Systems and Methods for Recording and Visually Recreating Sessions in a Client-Server Environment, Wenig, U.S. Pat. No. RE41,903.
U.S. Appl. No. 13/223,192, filed Aug. 31, 2011, Replaying Captured Network Interactions, Wenig, 2012-0084437.
U.S. Appl. No. 13/337,905, filed Dec. 27, 2011, Method and Apparatus for Monitoring and Synchronizing User Interface Events With Network Data, Wenig, U.S. Pat. No. 8,335,848.
U.S. Appl. No. 13/419,179, filed Mar. 13, 2012, Method and Apparatus for Intelligent Capture of Document Object Model Events, Powell, 2012-0173966.
U.S. Appl. No. 12/191,585, filed Aug. 14, 2008, Method and System for Communication Between a Client System and a Server System, Wenig, 2010-0042573.
U.S. Appl. No. 12/750,607, filed Mar. 30, 2010, Visualization of Website Analytics, Cordasco, 2010-0251128.
U.S. Appl. No. 13/401,725, filed Feb. 21, 2012, On-Page Manipulation and Real-Time Replacement of Content, Cordasco, 2012-0151329.
U.S. Appl. No. 09/113,376, filed Jul. 10, 1998, Systems and Methods for Recording and Visually Recreating Sessions in a Client-Server Environment, Wenig, U.S. Pat. No. 6,286,030.
U.S. Appl. No. 09/143,537, filed Aug. 28, 1998, System and Method for Encrypting Audit Information in Network Applications, Wenig, U.S. Pat. No. 6,286,098.
Communication from the EP Patent Office pursuant to Article 94(3) EPC in EP Application No. 09806979.2; dated Jan. 6, 2014.
Nino, et al., CARENA: A Tool to Capture and Replay Web Navigation Sessions; 2005, IEEE; pp. 127-141.
Smith et al., "Automated Protocol Analysis," Human Computer Interaction, 8:101-145, 1993.
Bishop, Matt et al., "A Model of Security Monitoring", Department of Mathematics and Computer Science, Dartmouth College, pp. 46-52. Dec. 1989.
Al-Qaimare G., et al., Kaldi: A Computer-Aided Usability Engineering Tool for Supporting Testing and Analysis of Human-Computer Interation:, Computer-Aided Design of User Interfaces. Proceedings of the International Conference on Computer-Aided Design of User Interfaces, Proceedings of CADUI, xx, xx, Oct. 21, 1999 (Oct. 21, 1999), pp. 337-355.
International Search Report for PCT/US08/65582; dated Sep. 11, 2008.
International Search Report for PCT/US2007/071096; dated May 13, 2008.
Written Opinion of the International Searching Authority for PCT/US08/65582; dated Sep. 11, 2008.
Written Opinion of the International Searching Authority for PCT/US07/71096; dated May 13, 2008.
PCT Search Report for PCT/US2011/033813; dated Jul. 28, 2011.
Written Opinion of the International Searching Authority for PCT/US2011/033813; dated Jul. 28, 2011.
International Search Report for PCT/US09/04654; dated Oct. 2, 2009.
Written Opinion of the International Searching Authority; PCT/US09/04654; dated Oct. 2, 2009.

(56) References Cited

OTHER PUBLICATIONS

Holloway, et al., "Cryptographic Initialization Test", IBM Technical Disclosure Bulletin, pp. 195-198, Feb. 1991.
International Search Report for PCT/US11/35410; dated Dec. 14, 2011.
Written Opinion of the International Searching Authority; PCT/US11/35410; dated Dec. 14, 2011.
Han et al., "Using Ajax for Desktop-;like Geospatial Web Application Development," Geoinformatics, 2009 17th International Conference on Aug. 12-14, 2009, <http://geobrain.laits.gmu.edu/geobrainhome/docs/GeOnAS_Ajax.pdf>.
Lubarsky, How to Delete Cookie Using Javascript, Aug. 19, 2007, http:web.archive.org/web/20070819123555/http://blogs.x2line.com/al/articles/316.aspx.
International Search Report for PCT/US12/25971; dated May 31, 2012.
Written Opinion of the International Searching Authority for PCT/US12/25971; dated May 31, 2012.
Peter Brusilovsky et. al., "Adaptive and Intelligent Web-based Educational Systems," International Journal of Artificial Intelligence in Education, Apr. 1, 2003 (Apr. 1, 2003), pp. 159-172, XP55039152, The Netherlands Retrieved from the Internet: URL: http://www.sis.pitt.edu/~peterb/papers/AIWBES.pdf [retrieved on Sep. 25, 2012] p. 160-161.
Atterer R et al. : "Knowing the User's Every Move—User Activity Tracking for Website Usability Evaluation and Implicit Interaction," WWW '06 Proceedings of the 15th World Wide Web, ACM, New York, NY, USA, May 22, 2006 (May 22, 2006), pp. 203-212, XP002519605, DOI: 10.1145/1135777.1135811 ISBN 978-1-5959-323-2.
Reed Martin; Using Google Analytics Site Overlay; Community Spark; Apr. 13, 2007. Online: <http://www.communityspark.com/using-google-analytics-site-overlay/>.
Stolowitz Ford Cowger LLP; Listing of Related Cases; Mar. 14, 2012.

\* cited by examiner

DYNAMIC ZOOMING OF CONTENT WITH OVERLAYS

The present application claims priority to U.S. Provisional Patent Application Ser. No. 61/727,915, entitled: DYNAMIC ZOOMING OF HTML CONTENT WITH OVERLAYS, filed Nov. 19, 2012, which is herein incorporated by reference in its entirety.

FIELD

This application relates generally to data processing and, more specifically, to displaying usage information.

BACKGROUND

A monitoring system may capture user events for webpages, such as mouse clicks, selections, keystroke entries, etc. An analysis system may track and display the user events associated with different locations within the webpage. For example, the analysis system may display heatmaps that show where users clicked on different webpage objects.

The analysis system may display darker images in the heat maps to represent more mouse clicks for the associated webpage location and may display lighter images to represent fewer mouse clicks for the associated webpage location. In another example, the analysis system may display usage clusters of the heat map in different colors to represent the number of mouse clicks.

An operator may have difficulties visually associating usage information with underlying webpage objects. For example, the analysis system may display a heat map usage cluster over multiple different webpage objects. The operator may want to view more detailed usage information for particular webpage objects. However, the analysis system may only display one static heat map for the entire webpage.

BRIEF SUMMARY

A dynamic zooming system may use overlays to display usage information over associated webpages. In one example, a replay manager may zoom-in on particular areas of the webpages to view more specific usage information. In another example, the replay manager may zoom-out the webpages to view more general usage information. The dynamic zooming system may use a first scaled overlay layer to dynamically vary a zoom level of the usage information to match a zoom level for the webpages. The dynamic zooming system also may use a second fixed overlay layer to display other usage information independently of the zoom-level for the webpages.

DETAILED DESCRIPTION

Figure 1:
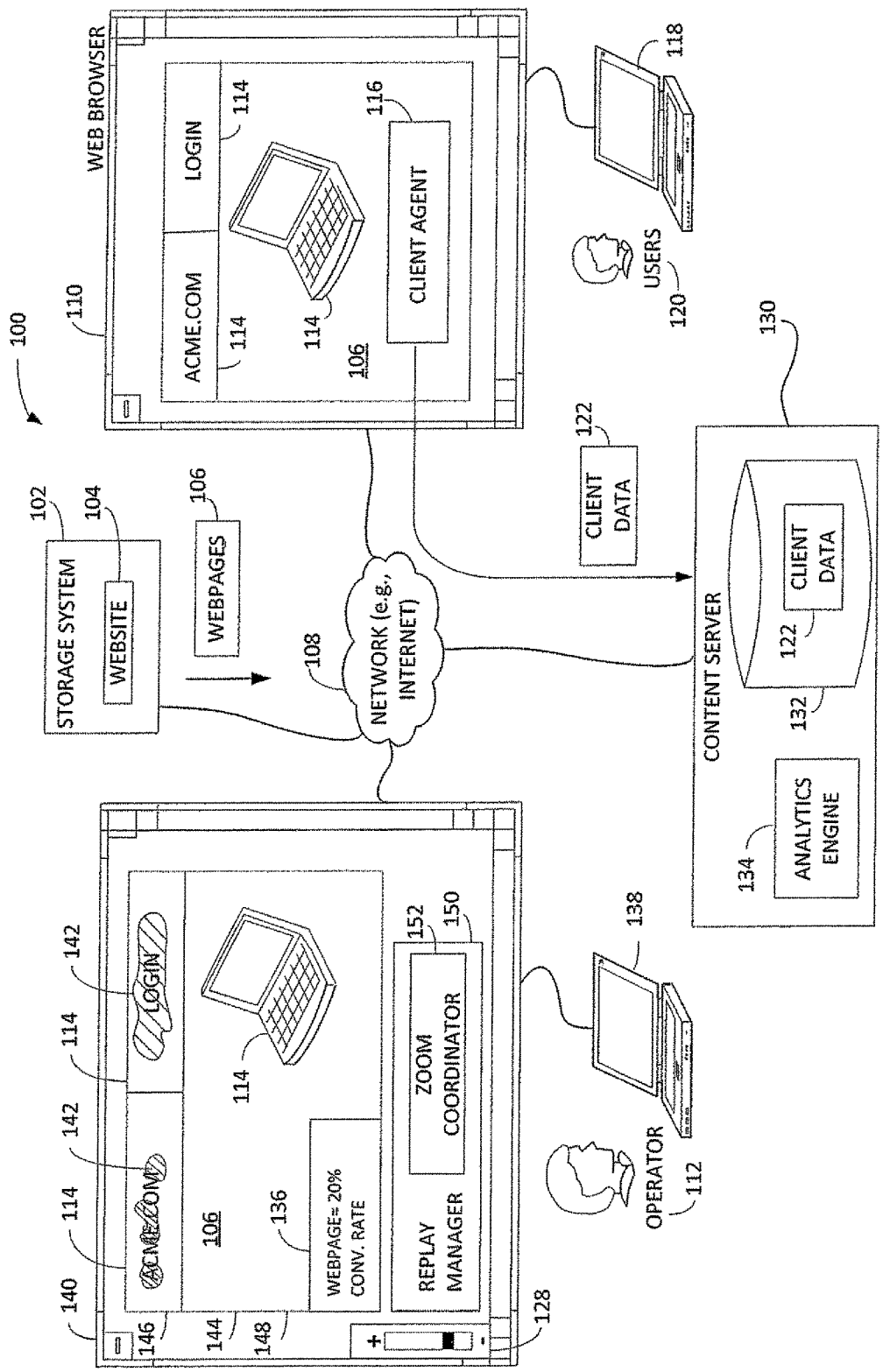
FIG. 1 depicts an example dynamic zooming system.

FIG. 1 depicts an example diagram of a content management system 100. A storage system 102 may store content, such as webpage 106 for a website 104 operated by an enterprise. In one example, the enterprise may be any company that sells products and/or services on-line to users 120. Of course, the enterprise operating storage system 102 and/or website 104 may be any service, business, company, individual, or other entity that provides information to users 120. Webpage 106 may comprise a home webpage for website 104 or any another webpage associated with website 104.

A network 108 may operably couple storage system 102 to a content server 130 and to different computing devices 118 and 138. Network 108 may comprise any combination of local area networks (LANs), wide area networks (WANs), Internet Protocol (IP) networks, phone networks, Public Services Telephone Networks (PSTN), wireless networks, cellular networks, Wi-Fi networks, Bluetooth networks, cable networks, data buses, or the like, or any combination thereof.

Content server 130 and computing devices 118 and 138 may comprise any devices configured to store and process content for web sessions. For example, content server 130 may comprise a data and/or web server and computing devices 118 and 138 may comprise tablet computers, hand-held devices, smart telephones, mobile telephones, personal digital assistants (PDAs), laptop computers, personal computers, computer terminals, PSTN telephones, voice over internet protocol (VoIP) phones, or the like, or any combination thereof.

Any one of users 120 may use computing device 118 to access website 104. For example, one of users 120 may open a web browser 110 and send Hypertext Transfer Protocol (HTTP) requests over network 108 to website 104. Website 104 may send webpage 106 back to web browser 110 in response to the HTTP requests. Web browser 110 then may display webpage 106 on a computer screen of computing device 118. Webpage 106 may contain webpage objects 114, such as text, icons, images, links, fields, hypertext markup language (HTML) code, extensible markup language (XML) code, document object models (DOMs) or the like, or any combination thereof.

A client agent 116 may capture client data 122 associated with webpage 106 during web sessions with users 120. Client data 122 may comprise mouse clicks, loaded webpages 106, text, control events, viewing times for webpage 106, viewing times for webpage objects 114, control events, or any other user input or state that may be entered during the web session. Client agent 116 may send captured client data 122 to content sever 130.

An operator 112 may comprise an employee of the enterprise associated with website 104, or any other person who wants to view usage information for webpage 106. A replay manager 150 may operate on computing device 138 and replay previously captured web sessions, and/or display usage information associated with webpage 106.

Replay manager 150 may replay web page information within a web browser 140. For example, relay manager 150 may render webpage 106 previously loaded into web browser 110 during the original web session. Replay manager 150 then may apply captured client data 122 to the rendered webpage 106. For example, replay manager 150 may display text entered into fields of webpage 106 during the original application session and display icons previously selected by users 120 during the application sessions.

An analytics engine 134 may derive usage information for webpage 106. For example, analytics engine 134 may determine a conversion rate, a bounce rate, a number of mouse clicks, a percentage of mouse clicks, an amount of time users 120 spend on webpages 106, or the like, or any combination thereof. Replay manager 150 may display the usage information in heat maps, reports, or any other objects. For example, replay manager 150 may display usage clusters 142 that identify mouse click locations on associated webpage objects 114 and may display a usage report 136 that identifies a conversion rate for webpage 106.

Operator 112 may change a zoom level, size, and/or location for webpage 106. For example, operator 112 may use a zoom controller 128, such as a slider bar icon, to zoom into specific areas of webpage 106. A zoom coordinator 152 may dynamically adjust the zoom level of the usage information based on the zoom level of webpage 106. For example, zoom coordinator 152 may dynamically adjust a height, width, scale, and/or position of usage clusters 142 based on the new zoom level, size and/or location of webpage objects 114.

Zoom coordinator 152 may maintain a same zoom level, size, and/or location for other usage information independently of the change for webpage 106. For example, zoom coordinator 152 may maintain a same zoom level, size and/or location for usage report 136. However, zoom coordinator 152 may update the usage information displayed within usage report 136 based on the change in webpage 106. In another example, zoom coordinator 152 may continue to display the same usage information within usage report 136 independently of the changes to webpage 106.

For discussion purposes, any changes to webpage 106, webpage objects 114, and/or a content layer containing webpage 106 and/or webpage objects 114 including but not limited to changes in height, width, scale, position, or the like, or any combination thereof will be referred to below as a change in a zoom level.

Figure 2:
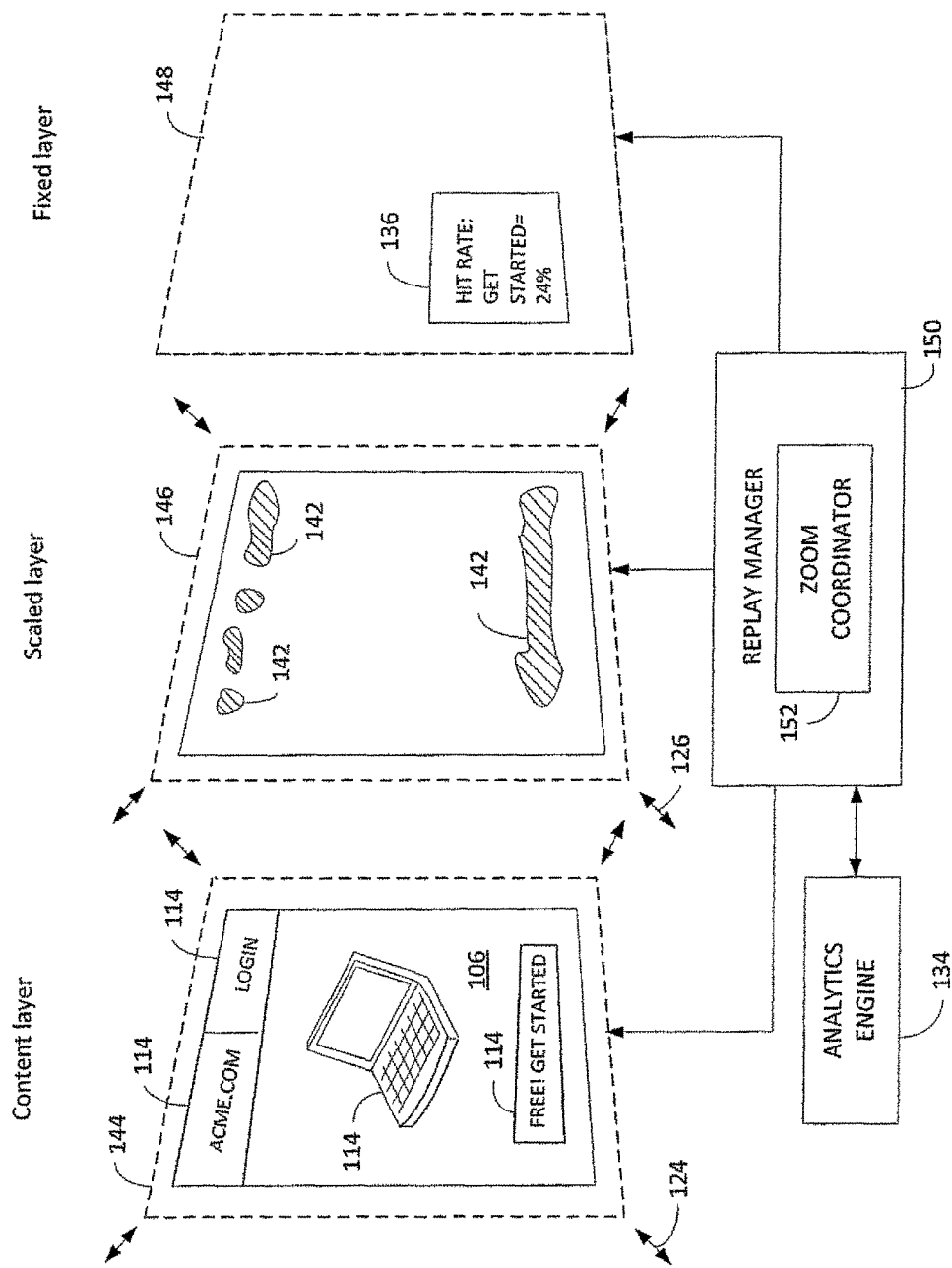
FIG. 2 depicts example overlays displayed by a dynamic zooming system.

FIG. 2 depicts a conceptual drawing of a content layer 144, a scaled layer 146, and a fixed layer 148. Each layer 144, 146, and 148 represents an overlay for a different Z-index level of a HTML stack. Webpage 106 may be contained within content layer 144 and webpage objects 114 may be contained on incrementally higher Z-index layers of content layer 144. However, webpage 106 and webpage objects 114 are shown within a same content layer 144 for illustrative purposes.

HTML may include Z-index properties for specifying a stack order for HTML elements. Objects with a greater stack order are displayed over objects with a lower stack order. For example, objects contained within scaled overlay layer 146 may have a higher z-index than objects located in content layer 144. HTML objects within fixed layer 148 may have a higher Z-index than HTML objects within content layer 144 and scaled layer 146.

Content layer 144 may consist of HTML inside a block-level element such as a HTML Document Division Element (DIV) or an Inline Frame (IFRAME). Scaled layer 146 may comprise a transparent IFRAME that operates above content layer 144 and matches the width, height, and position of content layer 144. Cascading style sheets 3 (CSS3) may transform the IFRAME based on changes in content layer 144. For example, changes in a zoom level 124 of content layer 144 may simultaneously cascade down to the CSS3 in scaled layer 146. Scaled layer 146 may be sandboxed from content layer 144 to prevent style errors. For example, objects in scaled layer 146 and fixed layer 148 do not alter how webpage 106 is displayed in content layer 144.

Scaled layer 146 or fixed layer 148 may display any usage information associated with webpage 106. For example, scaled layer 146 may display heatmaps that identify the number of mouse clicks on associated html webpage objects 114. In another example, scaled layer 146 may contain attention maps that show how long users viewed webpage objects 114. In yet another example, scaled layer 146 may display link analytics, such as pins and form fields indicating a percentage of users clicking on the webpage objects.

Fixed layer 148 may display reports that contain analytics associate with the usage information. For example, the report may display heatmap count associated with particular webpage objects. Of course, replay manager 150 may display any other usage information in scaled layer 146 or fixed layer 148. Fixed layer 148 also may display control elements such as a zoom controller or a page navigator for varying the webpages and zoom levels of the webpages.

Zoom coordinator 152 may operate in conjunction with replay manager 150 and analytics engine 134 to coordinate the calculation and display of usage information within scaled layer 146 and fixed layer 148. For example, the operator may perform a zoom-in or zoom-out operation that varies zoom level 124 of content layer 144. Zoom coordinator 152 may dynamically vary a zoom level 126 of scaled layer 146 based on zoom level 124. For example, zoom coordinator 152 may vary a size, scale, and/or location of usage clusters 142 to cover a same relative area and location over associated webpage objects 114.

Zoom controller 152 may display the size, scale, and/or location of objects within fixed layer 148 independently of zoom level changes 124 and 126. For example, prior to an operator initiated zoom operation, replay manager 150 may display usage report 136 at a particular location and with a particular size within fixed layer 148. The operator then may adjust zoom level 124 by either zooming-in or zooming-out content layer 144. Zoom coordinator 152 may vary zoom level 126 of usage clusters 142 within scaled layer 146 to match zoom level 124. However, zoom coordinator 152 may continue to display usage report 136 at the same size, scale, and/or location within fixed layer 148 independently of the change in zoom levels 124 and 126.

In one example, zoom coordinator 152 in coordination with analytics engine 134 and replay manager 150 may fix the zoom level of usage report 136 while dynamically and automatically updating the usage information displayed within usage report 136. For example, usage report 136 may display hit rates for different webpage objects 114 within webpage 106. The hit rates may indicate the percentage of clicks on webpage objects 114.

The operator may change zoom level 124 and zoom coordinator 152 may vary zoom level 126 for scaled layer 146 to correspond with zoom level 124. Zoom coordinator 152 also may dynamically update the hit rate displayed in usage report 136 to correspond with the different webpage objects 114 and associated usage clusters 142 displayed in the new zoom levels 124 and 126.

For example, a first zoom level 124 of content layer 144 may display an entire webpage object 114 and a second zoomed-in level 124 of content layer 144 only may display a portion of the webpage object. Zoom coordinator 152 may display a first hit rate in usage report 136 for the entire webpage object 114 displayed in the first zoom level 124. Zoom coordinator 152 then may display a new hit rate in usage report 136 for the partial portion of the webpage object 114 displayed in second zoom level 124.

Thus, zoom coordinator 152 in combination with replay manager 150 and analytics engine 134 may display usage information in scaled layer 144 over associated HTML objects in content layer 144. Zoom coordinator 152 also may dynamically zoom the usage information, such as usage clusters 142, over associated HTML webpage objects 114 in response to changes in zoom level 124.

Zoom coordinator 152 may display other usage information in fixed layer 148 above scaled layer 146. Zoom coordinator 152 may display usage information within fixed layer 148 at a particular size and location independently of changes to zoom levels 124 and 126. However, zoom coordinator 152 may dynamically update statistics for the usage information based on changes in zoom levels 124 and 126.

Figure 3:
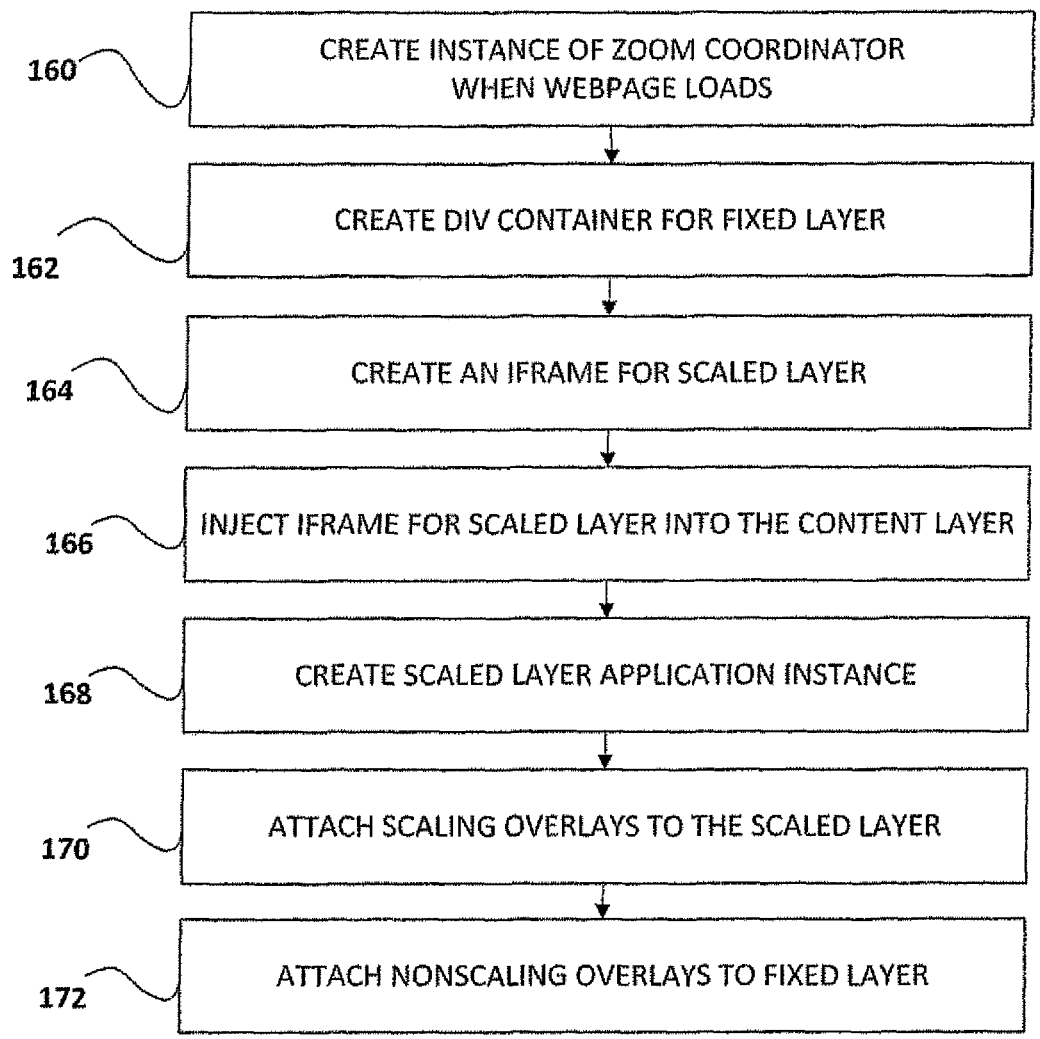
FIG. 3 depicts an example process for creating scaled overlay layers and fixed overlay layers.

FIG. 3 depicts an example process for implementing dynamic zooming. In operation 160, the replay manager may create and/or enable the zoom coordinator when a webpage is loaded. For example, the replay manager may create an instance of the zoom coordinator as described below in Table 1.0. This instance may exist at the window level of the webpage document and may trigger other operations when the replay manager activates overlays.

Table 1.0 shows one example of a zoom coordinator instance for insertion into webpage HTTP code and interaction with replay manager 150.

TABLE 1.0

```
var application = new cxzoom( );
```

The replay manager in operation 162 may create a DIV container for the fixed layer. The replay manager may insert the DIV container on top of the content layer and may configure the DIV container with dimensions large enough to hold the content layer.

The replay manager in operation 164 may create an IFRAME for the scaled layer and operation 164 may inject the scaled layer inside of the IFRAME above the content layer. Table 2.0 shows one example of how the replay manager may append or inject a scaled layer inside of the content layer. The code in Table 2.0 may generate an IFRAME for scaled layer 146 that matches the size of content layer 144.

TABLE 2.0

```
var scaledLayer = document.createElement('iframe');
scaledLayer.src = 'overlay.html';
matchContentLayerSize(scaledLayer);
matchContentLayerPosition(scaledLayer);
contentLayer.contentWindow.document.body.appendChild(scaledLayer);
```

The replay manger in operation 168 may create a scaled layer application instance. For example, the replay manager may create objects inside of Java script and pass the objects to the scaled layer and the fixed layer. The scaled layer instance may be a separate instance that enables two-way communication between the fixed layer and the scaled layer.

Table 3.0 shows one example of code that creates a scaled layer instance that enables the two-way communication between fixed layer 148 and scaled layer 146.

TABLE 3.0

```
scaledLayer.onload = function( ) {
    var instance = contentLayer.contentWindow.createInstance(application);
    instance.fixedLayer = application;
    application.scaledLayer = instance;
};
```

Operation 170 may attach scaling overlays to the scaled layer and operation 172 may attach non-scaling overlays to the fixed layer. The replay manager may attach the overlays in response to operator inputs. For example, the operator may direct the replay manager to load specific overlays, such as form analytics. In response to the operator input, the replay manager may attach components for the associated form analytics to the scaled and fixed layers. If the user then selects a heat map, the replay manager may delete the form analytics components from the overlays and attach the heat map components to the overlays.

Figure 4:
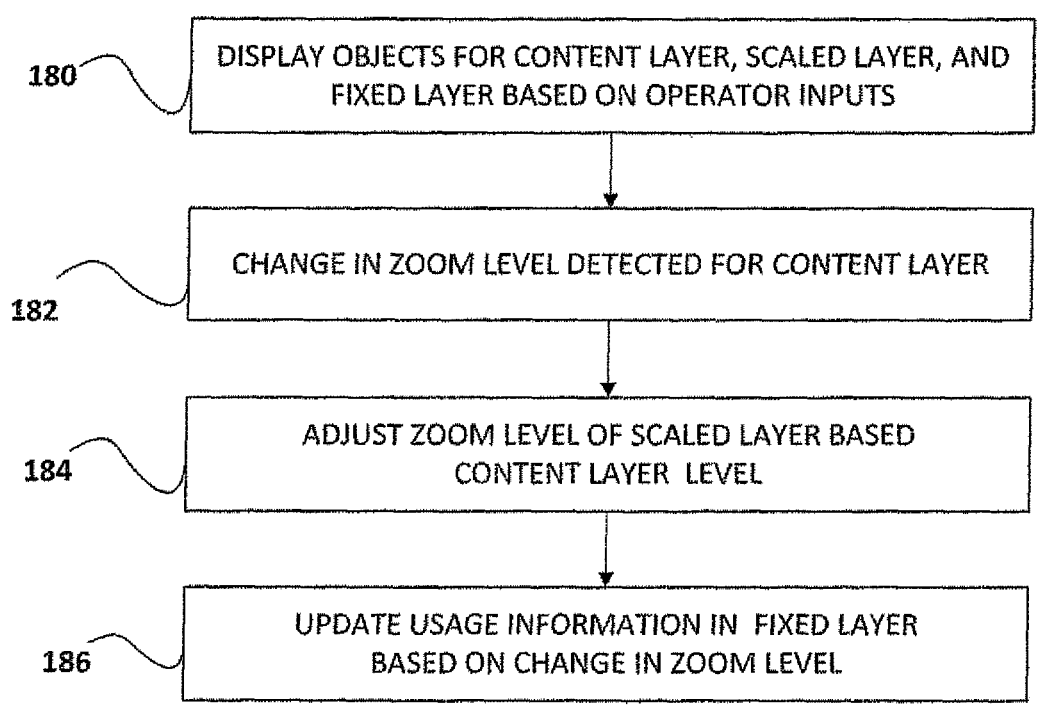
FIG. 4 depicts an example process for dynamically zooming usage information in a scaled layer and a fixed layer.

FIG. 4 depicts one example of how the replay manager may dynamically zoom usage information. In operation 180, the replay manager may display objects in the content layer, scaled layer, and fixed layer based on operator inputs. For example, the operator may select a particular webpage and select a particular type of analytics, such as a heat map. The replay manager then loads the selected webpage into a computer device and load display objects for the heat map into the webpage.

In operation 182, the zoom coordinator may detect a change in zoom level of the content layer. For example, the operator may zoom-in or zoom-out the webpage loaded by the replay manager. The zoom coordinator may fire an event that updates the scaled and/or fixed layer based on the new zoom level.

As described above, the zoom coordinator may handle the event differently for the content layer and the scale layer. In operation 184, the zoom coordinator may adjust the zoom level of the scaled layer to correspond to the zoom level of the content layer. For example, the operator may zoom-in on the loaded webpage. The zoom coordinator may dynamically zoom-in the usage information displayed in the scaled layer to correspond with the new zoom level. For example, the zoom coordinator may enlarge usage clusters in response to a zoom-in operation to cover a same relative location and portion of associated webpage objects.

In operation 186, the zoom coordinator may update the usage information displayed in the fixed layer to correspond to the zoom level for the content layer and scaled layer. For example, the zoom coordinator may update the usage information displayed in the fixed layer to correspond with the different portions of the webpage in the content layer and usage information in the scaled layer displayed after the zoom level change. However, the zoom coordinator may not vary the zoom level of control elements in the fixed layer or the zoom level of reports displaying usage information in the fixed layer.

Table 4.0 shows example code for a redraw function that executes after a zoom event. The operator may trigger the redraw function by changing the zoom level with the zoom controller displayed within the fixed layer.

TABLE 4.0

```
var redraw = function( ) {
contentLayer.css({ 'transform': 'scale(' + getZoomLevel( ) + ')',
'transform-origin': getOrigin( ),
'margin': getMargin( )
});
};
```

Figure 5:
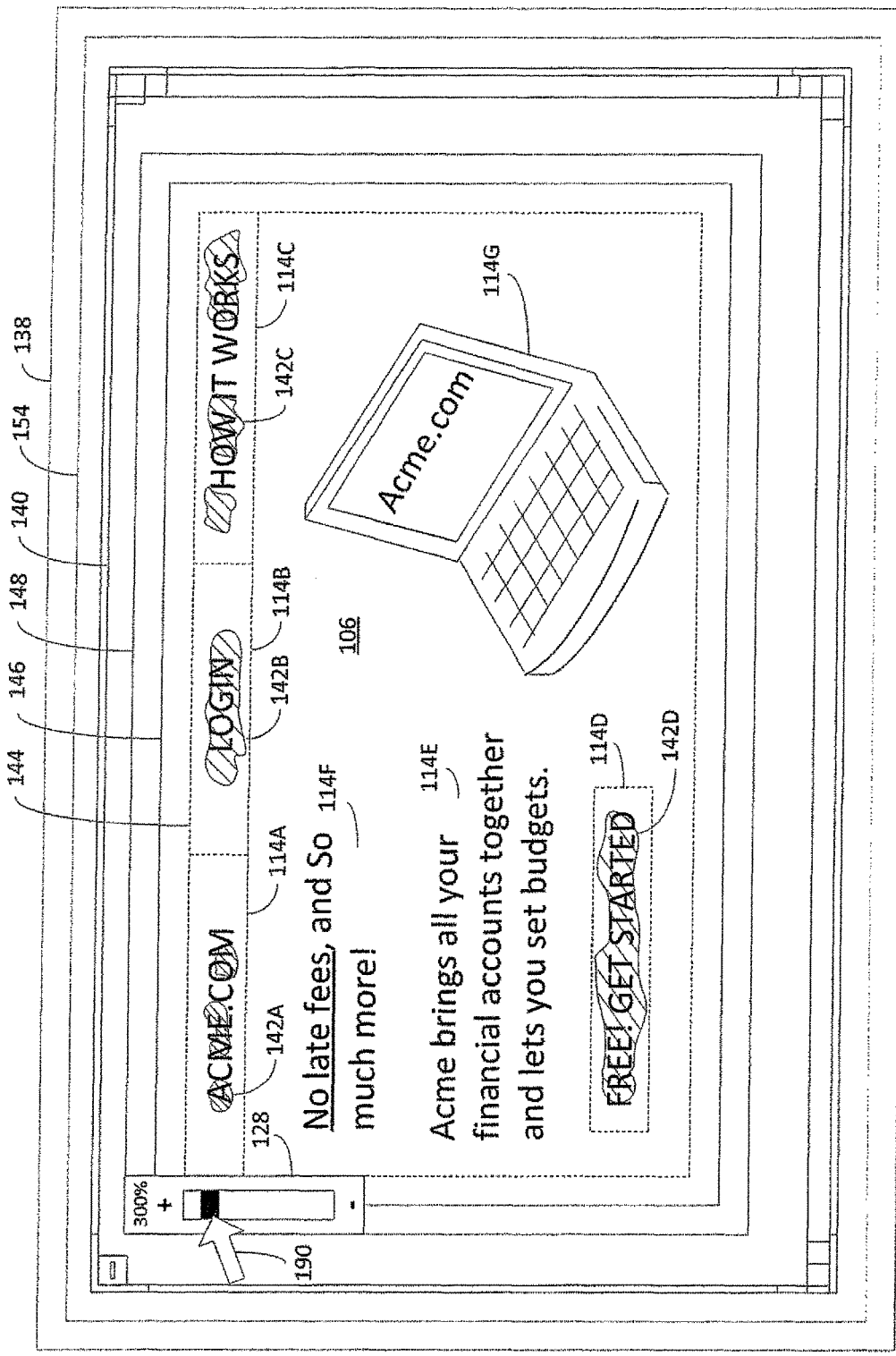
FIG. 5 depicts an example heat map displayed in a scaled layer.

FIG. 5 depicts an example webpage displayed within a screen 154 of computing device 138 during a replay session. The replay manager may display webpage 106 and webpage objects 114A-114G within content layer 144. The replay manager may display usage clusters 142A-142D within scaled layer 146 over associated webpage objects 114A-114D, respectively, and may display other usage information (not shown) in fixed layer 148 over content layer 144 and scaled layer 146.

Content layer 144 is shown in dotted lines and scaled layer 146 is shown extending over content layer 144. For illustrative purposes, an outside perimeter of scaled layer 146 extends out beyond an outside perimeter of content layer 144. However, the objects within scaled layer 146 may generally be dynamically zoomed to a same zoom level as webpage 106 and webpage objects 114 within content layer 144. Fixed layer 148 is shown with an outside perimeter that extends beyond the outside perimeters of content layer 144 and fixed layer 146.

The replay manager may display scaled layer 146 in a transparent color. For example, the replay manager may display usage clusters 142 in semi-transparent colors so the operator may view associated underlying webpage objects 114. As mentioned above, usage clusters 142 may represent places on webpage 106 where users performed mouse clicks, selections, entered data, etc. In one example, the replay manager may display usage clusters 142 with different colors or shades based on the number of associated user events. For example, the replay manager may use darker colors for the usage clusters 142 associated with more mouse clicks.

The replay manager may display zoom controller 128 within fixed layer 148. The operator may select zoom controller 128 with cursor 190 to change a zoom level of the objects within content layer 144. For example, the operator may drag a selector displayed on zoom controller 128 upwards to zoom-in webpage 106 and may drag the selector downwards to zoom-out webpage 106.

In another example, the replay manager may vary a size of webpage 106 in response to the operator selecting and dragging a corner of webpage 106 inward or outward. In another example, the replay manager may display a different portion of webpage 160 in response to the operator using cursor 190 to display a different portion of another webpage 106. The replay manager may dynamically zoom and/or move objects in scaled layer 146 and update usage information displayed within scaled layer 146 and fixed layer 148 based on the operator selections.

Figure 6:
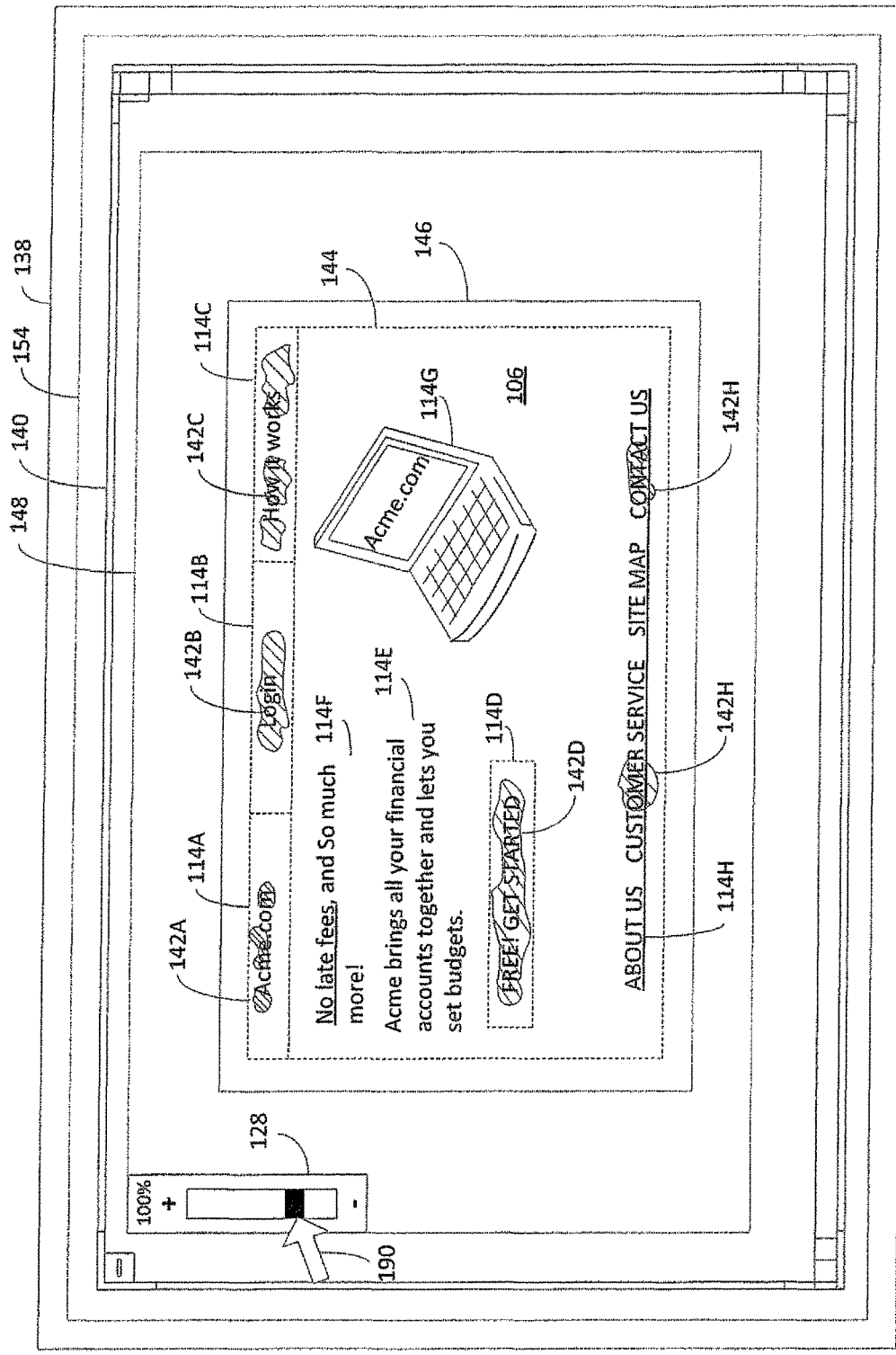
FIG. 6 depicts an example heat map displayed in response to a zoom level change.

FIG. 6 depicts one example of how the replay manager may dynamically zoom the sealed layer. In this example, the operator may have zoomed-out webpage 106 reducing the size of webpage objects 114A-114G and revealing additional webpage object 114H.

The replay manager may automatically change the zoom level of objects within scaled layer 146 to match the zoom level of webpage 106. For example, the replay manager may adjust the size, scale, and position of usage clusters 142A-142D to maintain a same relative size, scale, and position over associated zoomed-out webpage objects 114A-114D, respectively. The replay manager also may update usage information displayed within scaled layer 146 based on the operator input. For example, the replay manager may dynamically display new usage clusters 142H associated with newly displayed webpage object 114.

Figure 7:
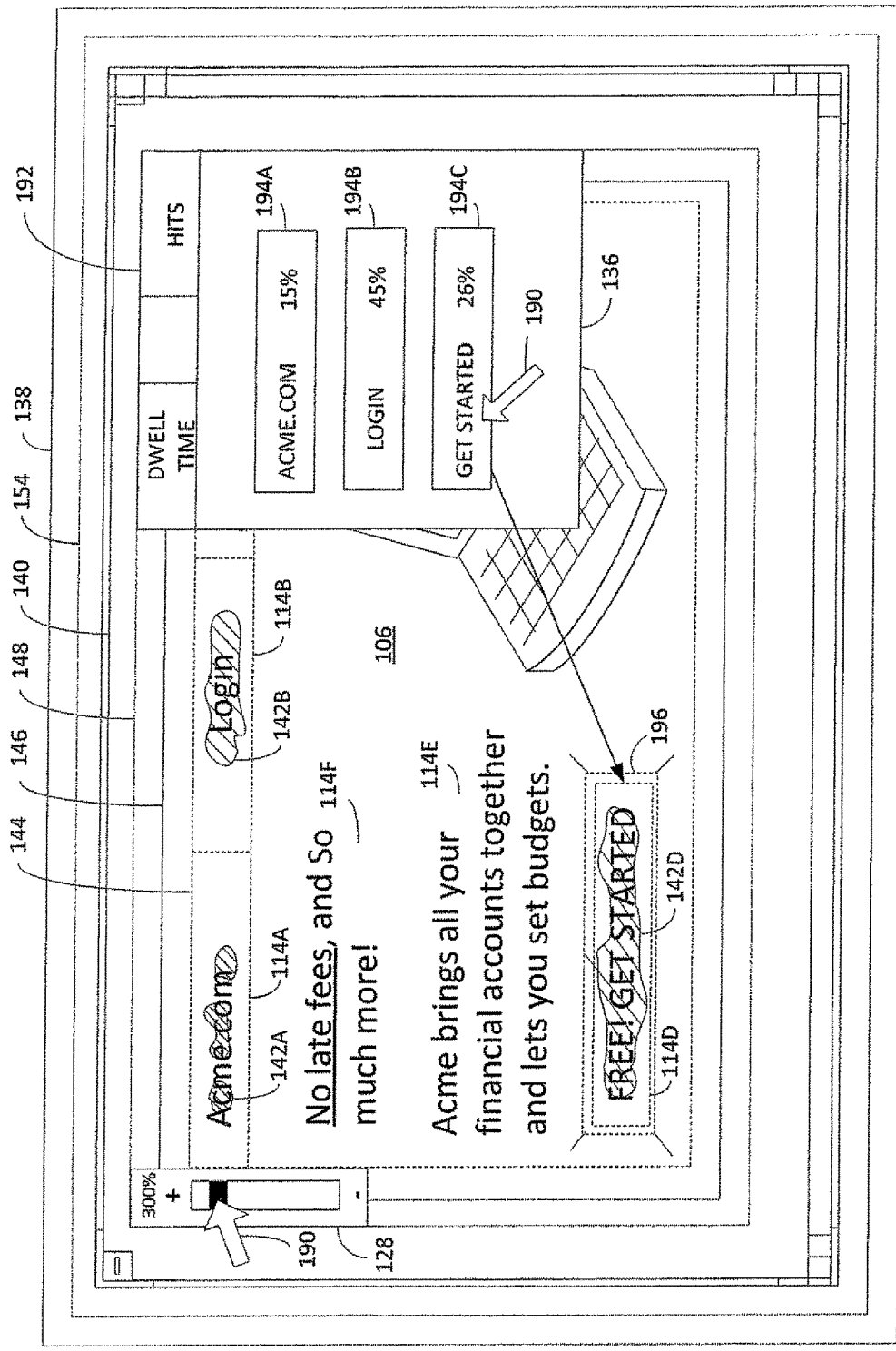
FIG. 7 depicts an example of usage information displayed in a scaled layer and in a fixed layer.

FIG. 7 depicts an example of how the replay system may display usage information within the fixed layer. The fixed layer may include an object displaying usage report 136. As mentioned above, the fixed layer also may include an object displaying zoom controller 128. The replay manager may display usage report 136 in response to the operator selecting one of tabs 192, or selecting or hovering over one of webpage objects 114 or usage clusters 142. The replay manager may obtain the usage information displayed in usage report 136 from the analytics manager.

The display manager may display any type of usage information within usage report 136. For example, as mentioned above usage report 136 may display a number of views for webpage 106, a number of hits on specific webpage objects 114, a bounce rate percentage for webpage 106, or the like, or any combination thereof. In another example, usage report 136 may identify when users clicked on webpage objects 114, the percentage of mouse clicks resulting in purchases, demographic information for the users associated with usage clusters 142, or the like, or any combination thereof.

Fields 194A-194C in usage report 136 may identify hit rates for different webpage objects 114A, 114B, and 114D, respectively. For example, the analytic system may count the number of times different users accessed webpage 106 over a given time period and count the total number of times each webpage object 114 was selected. Fields 194A-194C then may display the hit rates for webpage objects 114A, 114B, and 114D, respectively.

In one example, the replay manager may not display usage clusters 142 over certain portions of webpage 106. For example, the number of user clicks for webpage object 114E may be too small to display an associated usage cluster 142. The replay manager still may display analytic data by moving cursor 190 over webpage object 114E. The replay manager may detect the mouseover and display a popup report (not shown) identifying a number of mouse clicks, or any other usage information, associated with webpage object 114E. The object displaying popup report may be located within fixed layer 148 or scaled layer 146.

The replay manager may highlight one of webpage objects 114 in response to selection of one of fields 194. For example, the operator may select field 194C to provide a visual indicator of the associated webpage object 114D. In response to selection of field 194, the replay manager may insert an object within scaled layer 146 generating a transparent or translucent image 196 over webpage object 114D and usage cluster 142D. For example, a first object within fixed layer 148 may display usage repot 136. The first object may active a second object within scaled layer 146 that activates image 196.

Figure 8:
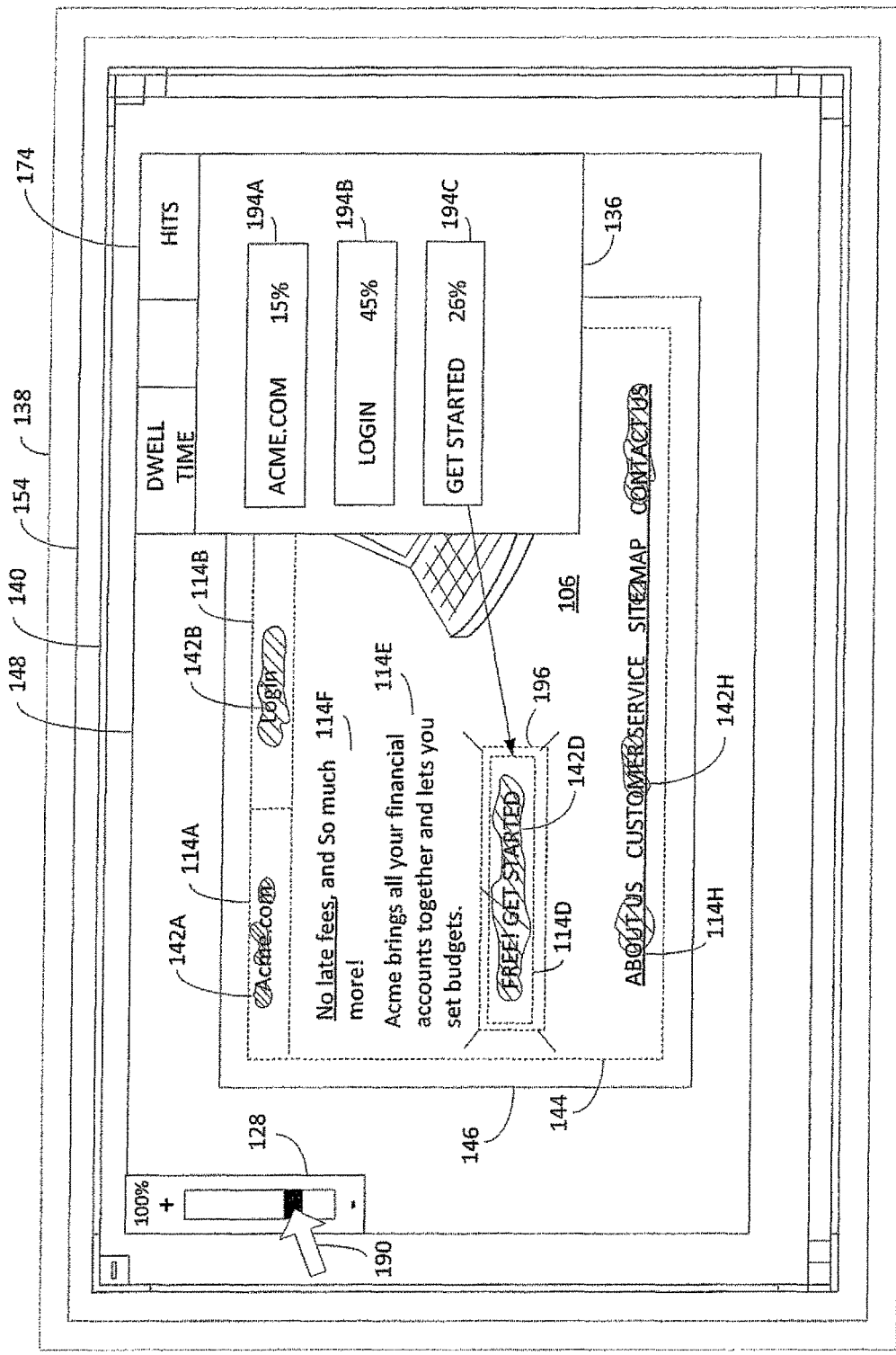
FIG. 8 depicts an example how a fixed layer and a scaled layer display usage information in response to a zoom level change.

FIG. 8 depicts one example of how the replay manager may display objects within fixed layer after a zoom operation. In this example, the replay manager may zoom-out webpage 106 in response to the operator moving the sliderbar on zoom controller 128. The replay manager may reduce the size of webpage 106 and webpage objects 114 and display additional webpage object 114H.

The replay manager may again dynamically zoom-out scaled layer 146 to match the zoom level of content layer 146. For example, the replay manager may reduce the size of usage clusters 142 proportionally with the reduced size of associated webpage objects 114. The replay manager also may reduce the size of highlighted image 196 to match the reduced size of webpage object 114D.

The replay manager may continue to display usage information and control information within fixed layer 148 independently of the zoom level of content layer 144 and scaled layer 146. For example, the replay manager may display usage report 136 and the usage information within fields 194A-194C at the same size and location as displayed prior to the zoom operation. The replay manager also may display the zoom controller 152 at a same size and location within fixed layer 148 as displayed before the zoom operation.

Figure 9:
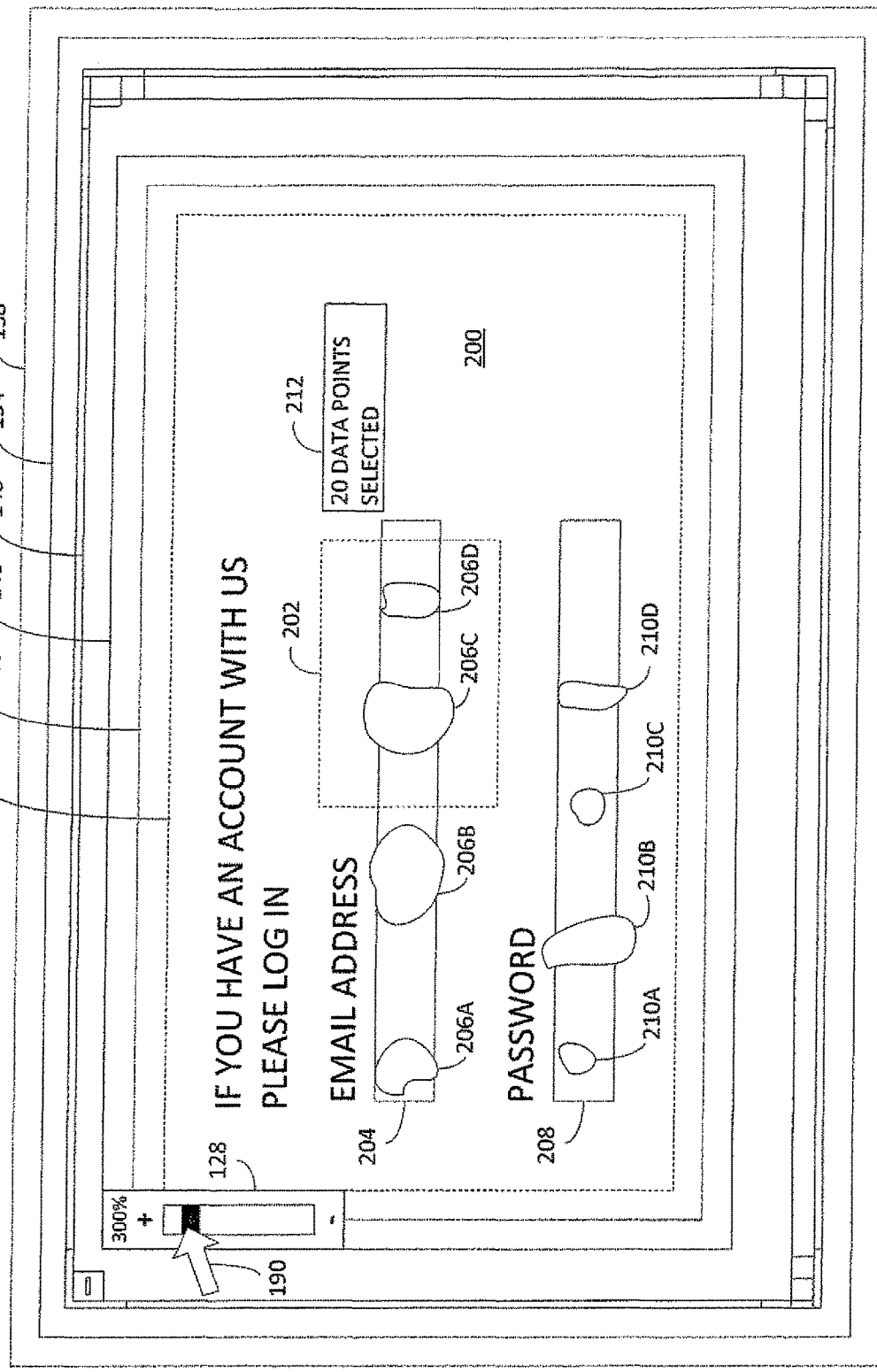
FIG. 9 depicts another example of usage information displayed in a scaled layer and in a fixed layer.

FIG. 9 depicts another example of how the replay manager may dynamically zoom usage information. The replay manager may display webpage 200 and webpage objects 204 and 208 within content layer 144. The replay manager may display usage clusters 206A-206D within scaled layer 146 over associated webpage object 204. The replay manager also may display usage clusters 210A-210D within scaled layer 146 over associated with webpage object 208.

The replay manager may display zoom controller 128, an analysis box 202, and a usage report 212 within fixed layer 148. A first object within scaled layer 146 may count the usage information within the boundary of analysis box 202. The first object then may pass the count value to a second object within fixed layer 148 that displays the count in usage report 212.

For example, analysis box 202 may extend over usage clusters 206C and 206D. The replay manager may count the number user clicks associated with usage clusters 206C and 206D and display the count number in usage report 212. For example, usage report 212 may identify 20 data points selected for usage clusters 206C and 206D.

Figure 10:
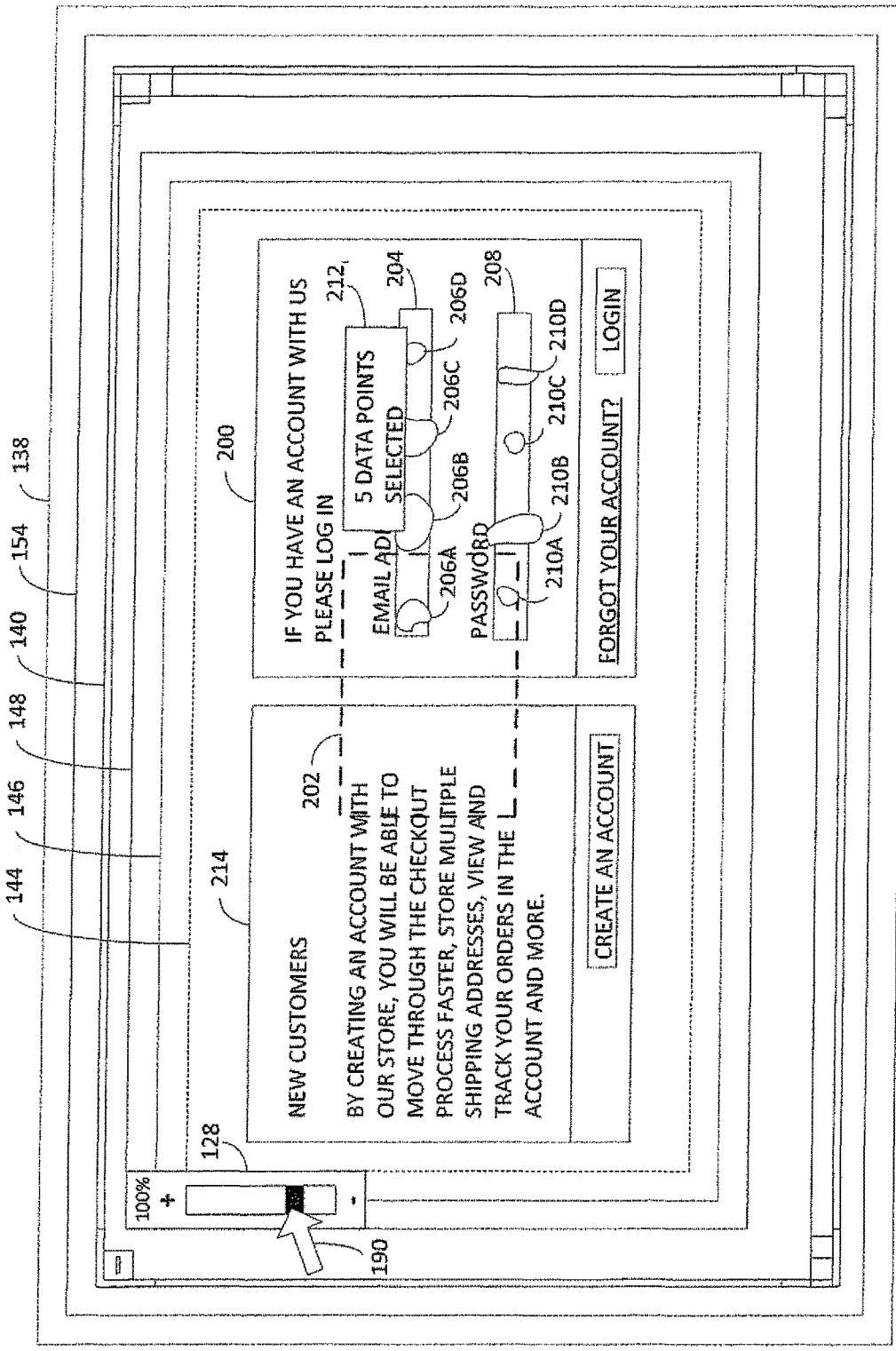
FIG. 10 depicts an example of how a fixed layer updates usage information after a zoom level change.

FIG. 10 depicts an example of how the display manager may update usage information in the fixed layer. The operator may change the zoom level of content layer 144 displayed in FIG. 9 by moving the slider on zoom controller 128 with cursor 190. In this example, the operator may zoom-out content layer 144 reducing the size of webpage 200 and revealing an additional webpage 214. The replay manager may reduce the size of webpage objects 204 and 208 in response to the zoom-out operation. The replay manager also may change the zoom level of usage clusters 206 and 219 within scaled layer 146 to match the new zoom level of content layer 144.

Analysis box 202 may cover a different group of usage clusters after the change in the zoom level of content layer 144. For example, analysis box 202 now may cover usage clusters 206A and 210A. The first object within scaled layer 146 associated with analysis box 202 may recount the number of data points associated with usage clusters 206A and 210A.

The first object may send the count number to the second object within fixed layer 148 displaying analysis box 202. The second object then displays the new count number in usage report 212. Thus, the replay manager may dynamically vary the usage information displayed in analytic box 202 based on the zoom level or movement of objects within content layer 144 and scaled layer 146.

The replay manager may display analytic box 202 at a default size and location. The operator may use cursor 190 to resize and/or reposition analytic box 202. The analytic engine may supply an original set of data points to the replay manager. The replay manager then may scale the number of data points and apply an offset to the data points to determine what count value to display within analytic box 202.

Figure 11:
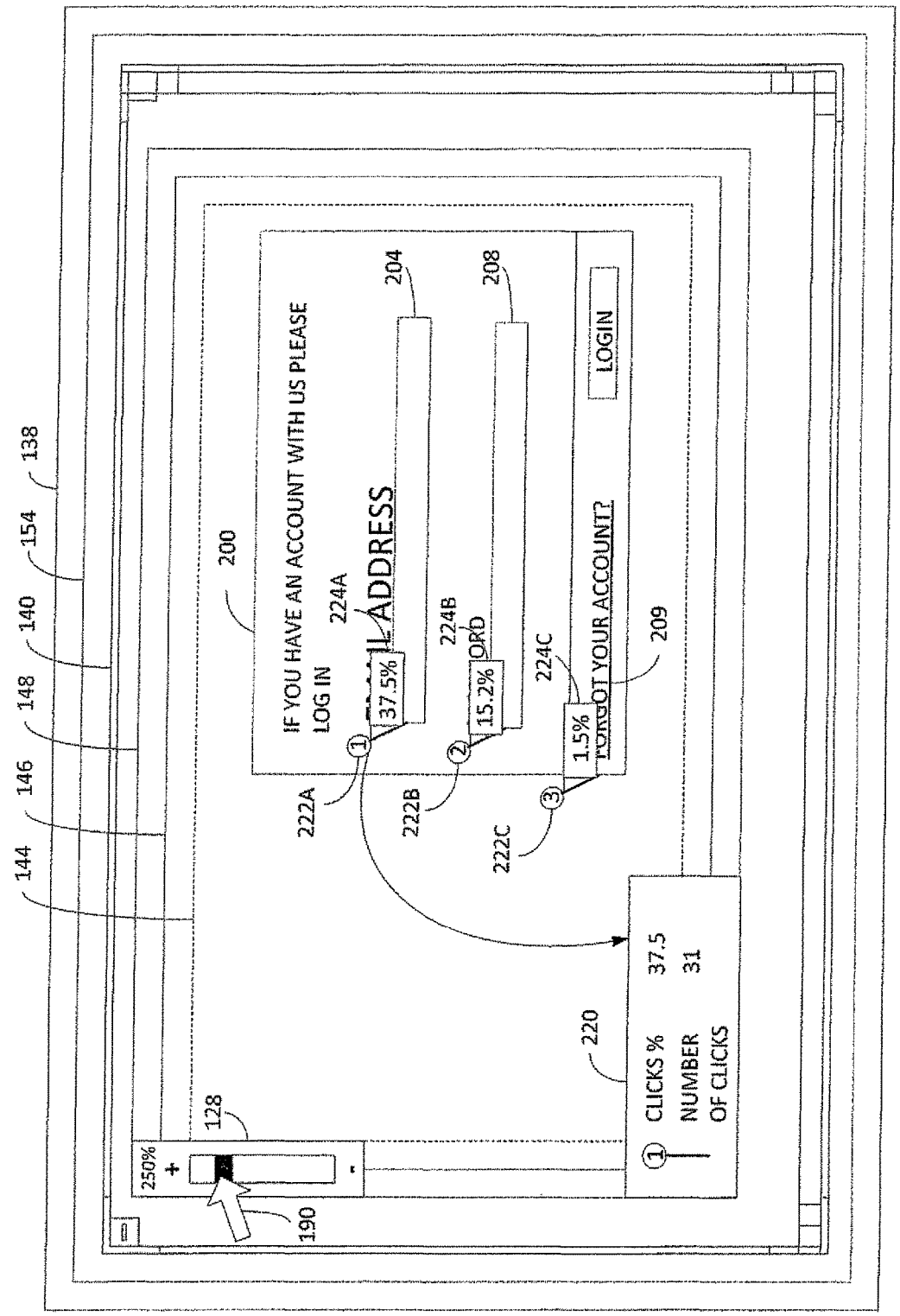
FIG. 11 depicts an example link analytics overlay.

FIG. 11 depicts an example of a link analytics overlay. The replay manager may display pin icons 222A-222C next to associated HTML webpage objects 204, 208, and 209, respectively. The replay manager also may display form fields 224A-224C next to associated pin icons 222A-22C, respectively. The replay manager may display pin icons 222 for the most highly selected webpage objects. For example, the top selection rates may comprise 37.2% for webpage object 204, 15.2% for webpage object 208, and 1.5% for webpage object 209. The replay manager may display the selection rates in associated form fields 224A-224C, respectively. The replay manager may attach a first object to scaled layer 146 that displays pin icons 222 and associated form fields 224.

The first object within scaled layer 146 may communicate with a second object within fixed layer 148. The second object may display a dialog box 220. The operator may select or hover over one of pin icons 222, such as pin icon 222A. The first object within scaled layer 146 may activate the second object within fixed layer 148 to display dialog box 220.

The first object also may send the selection rate for the selected pin icon 222A to the second object. The second object then may display the selection rate in dialog box 220. The second object may display additional usage information. For example, dialog box 220 may identify both the 37.5% click rate for webpage object 204 and identify the total number of clicks or user selections for webpage object 204.

Figure 12:
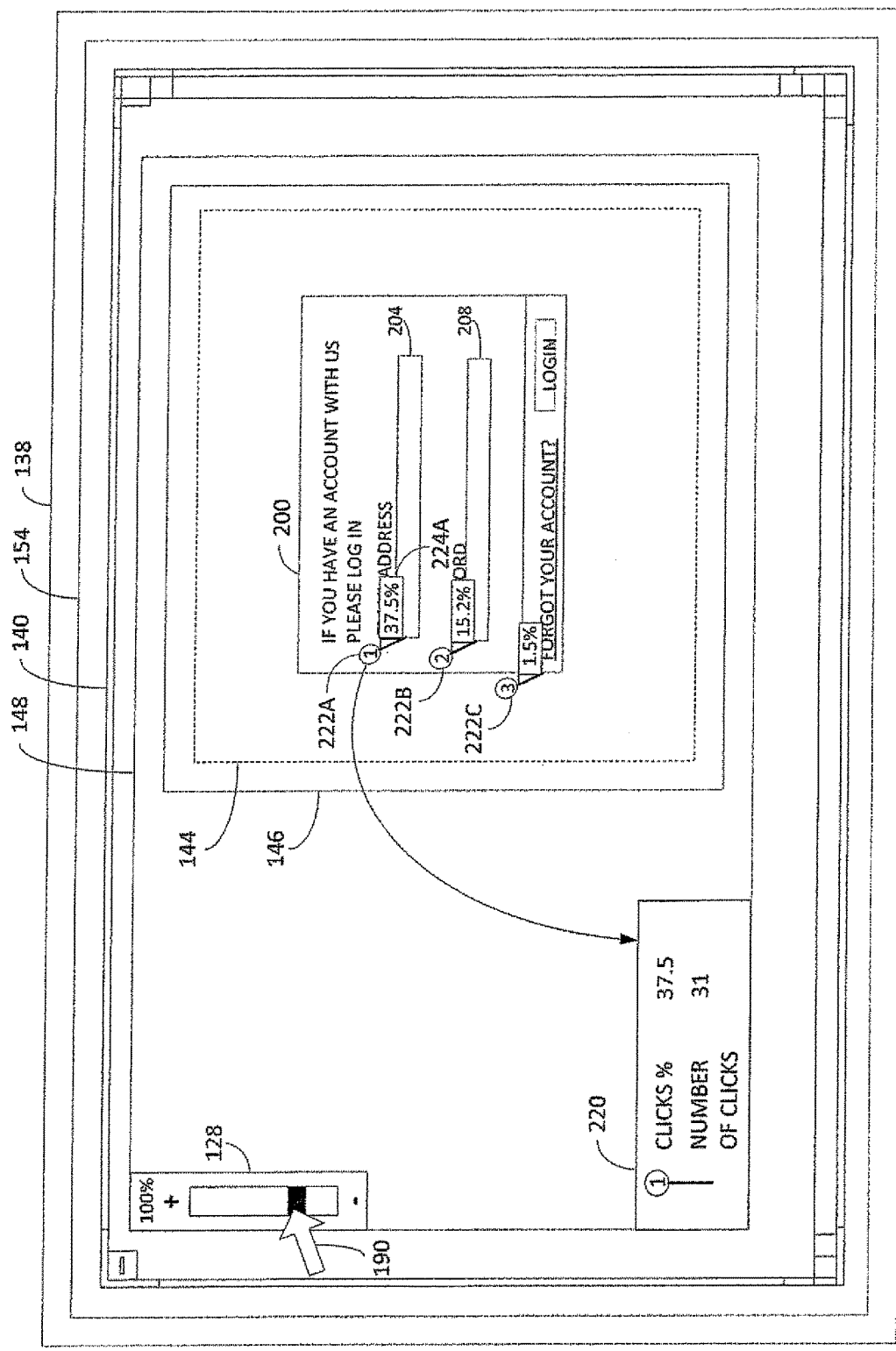
FIG. 12 depicts an example of how a scaled layer and a fixed layer display a link analytic overlay after a zoom level change.

FIG. 12 depicts an example of how the replay manager may dynamically zoom the links analytics overlay. The operator may zoom-out webpage 200 in response to a new zoom level selected by the operator via zoom controller 128. Since pin icons 222 and associated form fields 224 are located within scaled layer 146, the replay manager may simultaneously zoom-out pin icons 222 and form fields 224 with webpage 200.

Since dialog box 220 is located within fixed layer 148, the replay manager may continue to display dialog box 220 and the usage information within dialog box 220 at the same size and location within fixed layer 148 independently of the new zoom level. The first object within scaled layer 146 may continue to pass the selection rate information to the second object within fixed layer 148. Thus, dialog box 220 continues to display the selection rate information as form field 224A independently of the smaller size of pin icon 222A, form field 224A, and the usage information within form field 224A.

The dynamic zooming described above may be helpful when displaying usage information for application sessions with mobile devices. The mobile devices may have relatively small screens compared with the screens on personal computers. Thus, an operator may need to zoom-in and/or move the smaller electronic pages associated with the mobile devices to view associated usage information. Dynamic zooming allows an operator to zoom-in to different specific locations with the electronic pages still clearly see associated usage information.

Hardware and Software

Figure 13:
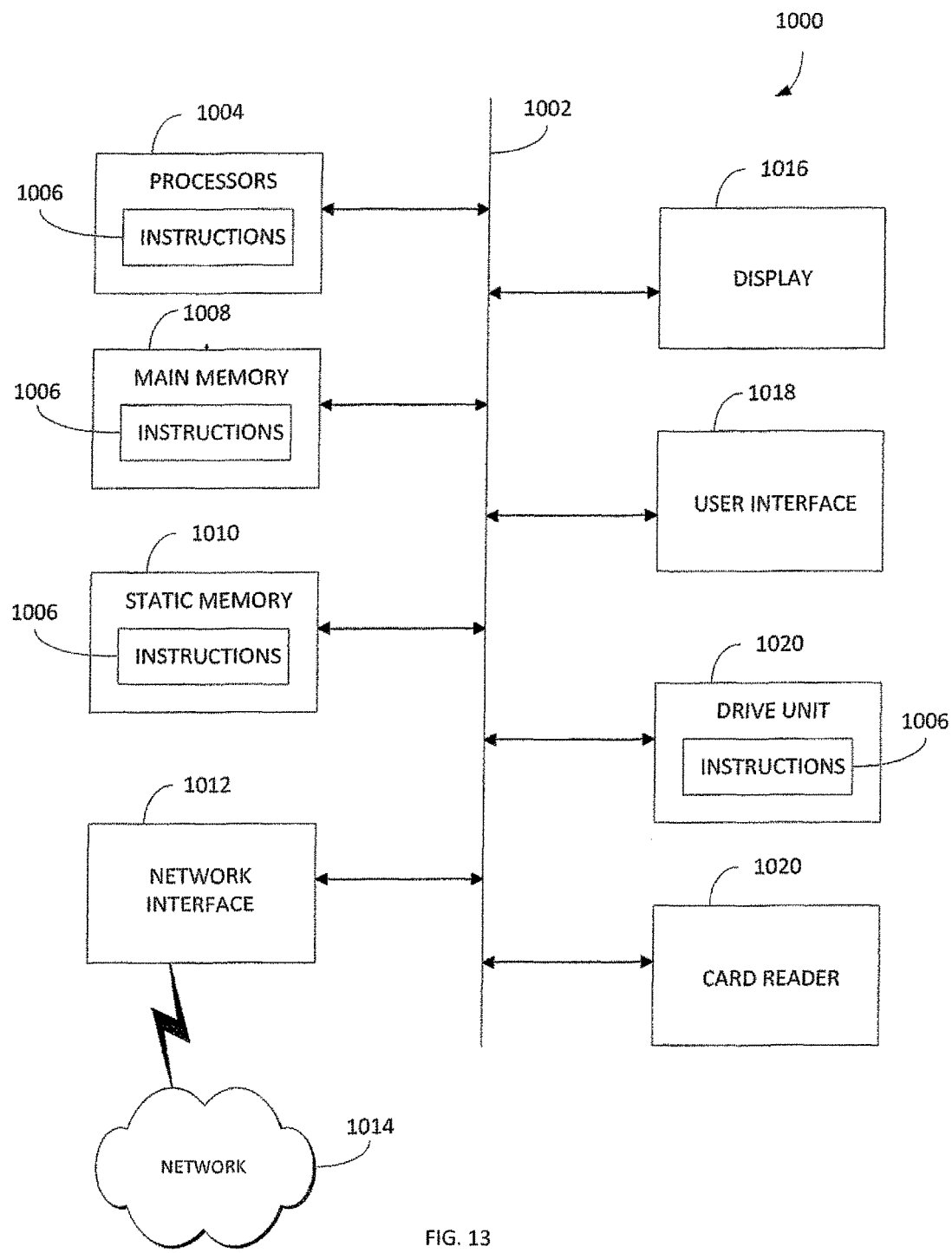
FIG. 13 depicts an example computing system for implementing a dynamic zooming system.

FIG. 13 shows a computing device 1000 that may be used for operating the dynamic zooming system discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A computer program product for replaying an application session, the computer program product comprising a computer readable storage medium having program code embodied wherewith, wherein the computer readable storage medium is not a transitory medium, the program code readable/executable by a computer to perform a method comprising:

initiating, by the computer, a replay of one or more application sessions captured over one or more selected time periods, by:

displaying, by the computer, one or more webpage objects within a content layer of a webpage, and displaying, by the computer, usage information captured during the one or more application sessions over the one or more selected time periods and associated with the one or more webpage objects within a scaled layer of the webpage, wherein the scaled layer operates above the content layer and the usage information is displayed in the scaled layer over the one or more webpage objects within the content layer and corresponds to one or more user events associated with the one or more webpage objects within the content layer, and wherein the usage information is placed within the scaled layer to prevent changes in a zoom level of the content layer from affecting the display of the usage information;

detecting, by the computer, a change in the zoom level of the content layer during the replay of the one or more application sessions;

changing, by the computer, during the replay of the one or more application sessions, the zoom level of the usage information displayed within the scaled layer based on the zoom level of the content layer and in response to detecting the change in the zoom level of the content layer;

identifying, by the computer, during the replay of the one or more application sessions, a portion of the usage information associated with a first object located within the scaled layer;

in response to identifying the portion of the usage information associated with the first object, communicating, by the computer, during the replay of the one or more application sessions, the portion of the usage information from the first object located within the scaled layer to a second object located within a fixed layer of the webpage and displaying the portion of the usage information associated with the second object within the fixed layer of the webpage, wherein the fixed layer is an HTML element that is separate from the content layer and the scaled layer such that the fixed layer is independent of the zoom level of the content layer and two-way communication between the scaled layer and the fixed layer is enabled by the scaled layer; and displaying, by the computer, during the replay of the one or more application sessions, additional usage information associated with the one or more webpage objects within the fixed layer of the webpage, wherein a zoom level of the additional usage information within the fixed layer is unaffected by the detected change in the zoom level of the content layer and wherein the additional usage information is dynamically updated based on the detected change in the zoom level of the content layer and one or more user events associated with the one or more webpage objects.

2. The computer program product of claim 1, wherein the webpage objects comprise a first set of hypertext markup language (HTML) objects for a webpage within the content layer and the usage information is displayed by a second set of HTML objects within the scaled layer.

3. The computer program product of claim 1, wherein the method further comprises displaying, by the computer, the usage information within the scaled layer at a Z-index level above the content layer.

4. The computer program product of claim 1, wherein the method further comprises displaying, by the computer, a heatmap within the scaled layer over the content layer, wherein the usage information is displayed within the heatmap.

5. The computer program product of claim 1, wherein the method further comprises:

inserting, by the computer, an inline frame (IFRAME) within a webpage containing the webpage objects; and displaying, by the computer, the usage information within the IFRAME.

6. The computer program product of claim 1, wherein the method further comprises:

generating, by the computer, usage clusters from the usage information;

identifying, by the computer, the webpage objects associated with the usage clusters; and displaying, by the computer, the usage clusters within the scaled layer over the associated webpage objects.

7. The computer program product of claim 6, wherein changing the zoom level of the content layer changes a size and location of the webpage objects and changing the zoom level of the scaled layer changes a size and location of the usage clusters to maintain substantially a same relative position and coverage over the associated webpage objects.

8. The computer program product of claim 1, wherein the method further comprises:

displaying, by the computer, form fields over the webpage objects;

displaying, by the computer, the usage information within the form fields; and varying, by the computer, sizes of the form fields and sizes of the usage information displayed within the form fields based on the zoom level of the content layer.

9. The computer program product of claim 1, wherein the method further comprises:

detecting, by the computer, selection of the usage information for an associated one of the webpage objects;

displaying, by the computer, a highlighted overlay within the scaled layer over the associated one of the webpage objects; and varying, by the computer, a zoom level of the highlighted overlay based on the zoom level of the content layer.

10. The computer program product of claim 1, wherein the method further comprises:

displaying, by the computer, the usage information within the scaled layer at a Z-index level above the content layer; and displaying, by the computer, the additional usage information within the fixed layer at a Z-index level above the scaled layer.

11. The computer program product of claim 1, wherein the method further comprises updating, by the computer, the additional usage information within the fixed layer based on the zoom level of the content layer.

12. The computer program product of claim 1, wherein the method further comprises:

inserting, by the computer, a Document Division Element (DIV) container into the content layer; and displaying the fixed layer within the DIV container.

13. The computer program product of claim 1, wherein the method further comprises:

generating, by the computer, control icons configured to control the zoom level of the content layer; and displaying, by the computer, the control icons within the fixed layer.

14. The computer program product of claim 1, wherein the method further comprises:

displaying, by the computer, an analysis box within the fixed layer, wherein the analysis box covers a portion of the usage information, and wherein a zoom level of the analysis box is unaffected by the detected change in the zoom level of the content layer;

counting, by the computer, a first number of events for the usage information covered by the analysis box prior to detecting the change in the zoom level of the content layer;

displaying, by the computer, the first number of events within a usage report in the fixed layer;

counting, by the computer, a second number of events for the usage information covered by the analysis box in response to detecting the change in the zoom level of the content layer, wherein the analysis box covers a different portion of the usage information due to the change in the zoom level of the content layer; and updating, by the computer, the usage report to display the second number of events in response to counting the second number of events.

15. An apparatus, comprising:

a memory configured to store objects and store usage information associated with one or more webpage objects; and logic circuitry configured to:

initiate a replay of one or more application sessions captured over one or more selected time periods, by:

displaying a webpage comprising the one or more webpage objects within a computer screen, and displaying the usage information captured during the one or more application sessions over the one or more selected time periods in a scaled overlay over the associated one or more webpage objects, wherein the usage information corresponds to one or more user events associated with the one or more webpage objects, and wherein the usage information is placed within the scaled layer to prevent changes in a zoom level of the content layer from affecting the display of the usage information;

detect an input changing a size of the webpage comprising the one or more webpage objects during the replay of the one or more application sessions;

vary, during the replay of the one or more application sessions, a size of the scaled overlay based on the size of the webpage comprising the one or more webpage objects;

identify, during the replay of the one or more application sessions, a portion of the webpage displayed within the computer screen after the change in the size of the webpage and usage information associated with a first object located within the scaled overlay, wherein the usage information associated with the first object corresponds to one or more user events associated with the one or more webpage objects within the portion of the webpage displayed within the computer screen after the change in the size of the webpage;

in response to identifying the portion of the webpage displayed within the computer screen after the change in the size of the webpage and usage information associated with the first object within the scaled overlay, communicate, during the replay of the one or more application sessions, from the first object to a second object located within a fixed overlay, the usage information associated with the first object and dynamically display the usage information associated with the first object by the second object within the fixed overlay of the computer screen, wherein the fixed overlay is an HTML element that is separate from the scaled overlay such that objects displayed in the fixed overlay and the scaled overlay do not alter the one or more webpage objects and two-way communication between the scaled overlay and the fixed overlay is enabled by the scaled overlay; and display, during the replay of the one or more application sessions, additional usage information in the fixed overlay independently of changes to the size of the one or more objects, wherein the additional usage information is dynamically updated based on the detected change in the size of the webpage comprising the one or more webpage objects and the one or more user events associated with the one or more objects.

16. The apparatus of claim 15, wherein the objects comprise webpage objects within a hypertext markup language (HTML) webpage and the logic circuitry is further configured to insert HTML objects within the HTML webpage configured to display the usage information and vary a display size of the usage information based on the size of the HTML webpage.

17. The apparatus of claim 15, wherein the logic circuitry is further configured to:
detect a change in a zoom level of the objects; and
change a zoom level of the usage information in the scaled overlay to match the zoom level of the objects.

18. The apparatus of claim 15, wherein the logic circuitry is further configured to:
derive usage clusters from the usage information, wherein the usage clusters show selection locations for the objects;
vary a zoom level of the objects; and
vary a zoom level of the usage clusters based on the zoom level of the objects.

19. The apparatus of claim 15, wherein the objects comprise HTML webpage objects and the scaled overlay comprises HTML objects configured to display the usage information on a Z-index layer above the HTML webpage objects.

20. The apparatus of claim 15, wherein the logic circuitry is further configured to display control elements within the fixed overlay, wherein the control elements are displayed in the fixed overlay independently of changes to the size of the objects.

21. The apparatus of claim 20, wherein the logic circuitry is further configured to change the size of the objects in response to inputs generated by the control elements.

22. A system, comprising:
a database configured to store one or more webpages displayed during one or more web sessions and store one or more user inputs entered during the one or more web sessions;
a content server configured to generate analytics associated with the one or more webpages based on the user inputs; and
a computing device configured to:
initiate a replay of one or more application sessions captured over one or more selected time periods, by:
displaying the one or more webpages during an analysis session, and
displaying the analytics in scaled overlays over the one or more webpages, wherein the analytics are placed within the scaled overlays to prevent changes in a zoom level of the one or more webpages from affecting the display of the analytics;
receive, during the replay of the one or more application sessions, an input changing the zoom level of the one or more webpages;
vary, during the replay of the one or more application sessions, the zoom level of the scaled overlays based on the zoom level of the one or more webpages and in response to changing the zoom level of the one or more webpages;
identify, during the replay of the one or more application sessions, a portion of the one or more webpages displayed after the change in the zoom level of the one or more webpages and analytics associated with a first object located within the scaled overlays, wherein the analytics associated with the first object corresponds to one or more user events associated with the portion of the one or more webpages displayed after the change in the zoom level;
in response to identifying the portion of the one or more webpages displayed after the change in the zoom level and analytics associated with a first object located within the scaled overlays, communicate, during the replay of the one or more application sessions, the analytics associated with the first object from the first object to a second object located in fixed overlays, the fixed overlays being HTML elements that are separate from the scaled overlays and displayed over the webpages such that objects displayed in the fixed overlays and the scaled overlays do not alter objects displayed within the one or more webpages and two-way communication between the scaled overlays and the fixed overlays is enabled by the scaled overlays; and display, during the replay of the one or more application sessions, reports associated with the analytics in the fixed overlays, wherein a zoom level of the fixed overlays is unaffected by changing the zoom level of the webpages and wherein the reports associated with the analytics are dynamically updated based on the detected change in the zoom level of the one or more webpages and the one or more user inputs entered during the one or more web sessions.

23. The system of claim 22, wherein the computing device is further configured to:

load the webpages;

insert a first set of objects into the webpages, wherein the first set of objects are configured to display a first set of the analytics and adjust a zoom level of the first set of the analytics to correspond with the zoom level of the webpages; and insert a second set of objects into the webpages, wherein the second set of objects are configured to display a second set of the analytics, and wherein a zoom level of the second set of the analytics is unchanged by changing the zoom level of the webpages.

24. The system of claim 23, wherein the first set of objects display usage clusters and the second set of objects display usage reports for the usage clusters.

25. The system of claim 23, wherein the computing device is further configured to:

insert a third set of objects into the webpages, wherein the third set of objects are configured to display icons configured to control the zoom level of the webpages; and display the icons within the third set of objects, wherein a zoom level of the icons is unaffected by changing the zoom level of the webpages.

26. The computer program product of claim 1, wherein the method further comprises:

displaying, by the computer, an additional webpage object within the content layer in response to the change in the zoom level of the content layer; and displaying, by the computer, usage information associated with the additional webpage object within the scaled layer in response to the additional webpage object being displayed within the content layer.

27. The apparatus of claim 15, wherein the logic circuitry is further configured to:

display a usage report including the usage information associated with the objects displayed within the computer screen prior to changing the size of the objects;

remove a portion of the objects from display within the computer screen in response to changing the size of the objects; and update the usage report to include usage information associated with the objects displayed within the computer screen after removing the portion of the objects.

28. The computer program product of claim 1, wherein the method further comprises:

detecting an interaction with a zoom controller located within the fixed layer; generating a request for the change in the zoom level of the content layer based on the interaction with the zoom controller; and performing the change in the zoom level of the content layer based on the request.

* * * * *